United States Patent
Yamaji et al.

(10) Patent No.: US 9,251,031 B2
(45) Date of Patent: Feb. 2, 2016

(54) DATA PROCESSING APPARATUS, DATA PROCESSING SYSTEM, AND DATA PROCESSING METHOD

(75) Inventors: Yusuke Yamaji, Kyoto (JP); Masahiro Ikumo, Kyoto (JP); Ryota Akai, Kyoto (JP); Yuhki Ueyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 171 days.

(21) Appl. No.: 14/347,103

(22) PCT Filed: Dec. 28, 2011

(86) PCT No.: PCT/JP2011/080453
§ 371 (c)(1),
(2), (4) Date: Mar. 25, 2014

(87) PCT Pub. No.: WO2013/046481
PCT Pub. Date: Apr. 4, 2013

(65) Prior Publication Data
US 2014/0250337 A1    Sep. 4, 2014

(30) Foreign Application Priority Data
Sep. 26, 2011 (JP) ................................. 2011-209907

(51) Int. Cl.
*G06F 11/00* (2006.01)
*G06F 11/34* (2006.01)
(Continued)

(52) U.S. Cl.
CPC ........ *G06F 11/3409* (2013.01); *G05B 19/4184* (2013.01); *G07C 3/00* (2013.01); *G05B 2219/23172* (2013.01); *G05B 2219/24097* (2013.01)

(58) Field of Classification Search
CPC ............ G06F 11/3409; G06F 11/3452; G06F 11/3466; G06F 11/3476
USPC ..................................................... 714/37, 39
See application file for complete search history.

(56) References Cited

U.S. PATENT DOCUMENTS 7,975,191 B2 * 7/2011 Ullrich ................... G11C 16/10
                                                              714/718
8,225,144 B2 * 7/2012 Kato ................... G06F 11/3409
                                                              714/47.1

(Continued)

FOREIGN PATENT DOCUMENTS

JP    S61-182143 A    8/1986
JP    62-166952 A    7/1987

(Continued)

OTHER PUBLICATIONS

International Search Report issued in corresponding International Patent Application No. PCT/JP2011/080453 dated Feb. 14, 2012 (4 pages).

(Continued)

*Primary Examiner* — Chae Ko
(74) *Attorney, Agent, or Firm* — Osha Liang LLP

(57) ABSTRACT

A data processing apparatus for generating running performance information indicative of a running state of at least one device, has a data storage process section that obtains device state information indicative of a result of detection of a state of the at least one device, and obtains operational activity performer information indicative of a result of detection of whether an operational activity performer that performs an operational activity to the at least one device or an operational activity with the at least one device is present at a predetermined position for the operational activity performer to do the operational activity on the at least one device or the operational activity with the at least one device, and causes the device state information and the operational activity performer information to be stored in a result-of-detection storage.

17 Claims, 12 Drawing Sheets

(51) Int. Cl.
*G07C 3/00* (2006.01)
*G05B 19/418* (2006.01)

(56) References Cited

U.S. PATENT DOCUMENTS

| | | | |
|---|---|---|---|
| 8,819,364 B2* | 8/2014 | Watanabe | G06F 11/3485 710/36 |
| 2003/0229711 A1* | 12/2003 | Cho | G06F 17/30864 709/231 |
| 2004/0010666 A1* | 1/2004 | Umbehocker | G06F 3/0607 711/156 |
| 2005/0270681 A1* | 12/2005 | Suzuki | G06F 1/184 360/69 |
| 2009/0089503 A1* | 4/2009 | Yoshida | G06F 11/008 711/114 |

FOREIGN PATENT DOCUMENTS

| | | |
|---|---|---|
| JP | 04-269150 A | 9/1992 |
| JP | 05-67261 A | 3/1993 |
| JP | 05-295640 A | 11/1993 |
| JP | H10-103589 A | 4/1998 |
| JP | H11-320346 A | 11/1999 |
| JP | 2003-091312 A | 3/2003 |
| JP | 2005-250990 A | 9/2005 |
| JP | 2006-163630 A | 6/2006 |
| JP | 2007-114967 A | 5/2007 |
| JP | 2009-080844 A | 4/2009 |
| WO | 2010/073289 A1 | 7/2010 |

OTHER PUBLICATIONS

Written Opinion of the International Searching Authority issued in corresponding International Patent Application No. PCT/JP2011/080453 dated Feb. 14, 2012 (6 pages).

International Preliminary Report on Patentability issued in corresponding International Patent Application No. PCT/JP2011/080453 dated Apr. 1, 2014 (4 pages).

Patent Abstracts of Japan for Japanese Publication No. 62-166952, publication date Jul. 23, 1987 (1 page).

Patent Abstracts of Japan for Japanese Publication No. 04-269150, publication date Sep. 25, 1992 (1 page).

Decision to Grant a Patent issued in corresponding Japanese Application No. 2011-209907, mailed on Jan. 6, 2015 (4 pages).

* cited by examiner

FIG. 2

|   | Measurement time | Detection process section ID | Sensor ID | Detected value |
|---|---|---|---|---|
| 1 | 2011-08-08 17:00:23 | 23 | 778 | 5627 |
| 2 | 2011-08-08 17:00:23 | 23 | 781 | 6133 |
| 3 | 2011-08-08 17:00:23 | 23 | 1030 | 0 |
| 4 | 2011-08-08 17:00:23 | 23 | 11788 | 0.01 |
| 5 | 2011-08-08 17:00:53 | 23 | 778 | 5624 |
| 6 | 2011-08-08 17:00:53 | 23 | 781 | 6133 |
| 7 | 2011-08-08 17:00:53 | 23 | 1030 | 0 |
| 8 | 2011-08-08 17:00:53 | 23 | 11788 | 0.01 |
| 9 | 2011-08-08 17:01:23 | 23 | 778 | 5624 |
| 10 | 2011-08-08 17:01:23 | 23 | 781 | 6131 |
| 11 | 2011-08-08 17:01:23 | 23 | 1030 | 0 |
| 12 | 2011-08-08 17:01:23 | 23 | 11788 | 0.01 |
| 13 | 2011-08-08 17:01:53 | 23 | 778 | 5629 |
| 14 | 2011-08-08 17:01:53 | 23 | 781 | 6131 |
| 15 | 2011-08-08 17:01:53 | 23 | 1030 | 0 |
| 16 | 2011-08-08 17:01:53 | 23 | 11788 | 0.01 |
| 17 | 2011-08-08 17:02:23 | 23 | 778 | 5629 |
| 18 | 2011-08-08 17:02:23 | 23 | 781 | 6133 |
| 19 | 2011-08-08 17:02:23 | 23 | 1030 | 0 |
| 20 | 2011-08-08 17:02:23 | 23 | 11788 | 0.01 |
| 21 | 2011-08-08 17:02:53 | 23 | 778 | 5627 |
| 22 | 2011-08-08 17:02:53 | 23 | 781 | 6133 |
| 23 | 2011-08-08 17:02:53 | 23 | 1030 | 0 |
| 24 | 2011-08-08 17:02:53 | 23 | 11788 | 0.01 |
| 25 | 2011-08-08 17:03:23 | 23 | 778 | 5629 |
| 26 | 2011-08-08 17:03:23 | 23 | 781 | 6136 |
| 27 | 2011-08-08 17:03:23 | 23 | 1030 | 0 |
| 28 | 2011-08-08 17:03:23 | 23 | 11788 | 0.01 |
| 29 | 2011-08-08 17:03:53 | 23 | 778 | 5627 |
| 30 | 2011-08-08 17:03:53 | 23 | 781 | 6131 |
| 31 | 2011-08-08 17:03:53 | 23 | 1030 | 0 |
| 32 | 2011-08-08 17:03:53 | 23 | 11788 | 0.01 |

FIG. 3

|    | Time | Device ID | Result of classification |
|----|------|-----------|--------------------------|
| 1  | 2011-08-08 18:01:00 | 1507 | 2 |
| 2  | 2011-08-08 18:01:00 | 1512 | 3 |
| 3  | 2011-08-08 18:01:00 | 1601 | 1 |
| 4  | 2011-08-08 18:01:00 | 1603 | 1 |
| 5  | 2011-08-08 18:01:00 | 1605 | 1 |
| 6  | 2011-08-08 18:01:00 | 1612 | 1 |
| 7  | 2011-08-08 18:02:00 | 1507 | 2 |
| 8  | 2011-08-08 18:02:00 | 1512 | 3 |
| 9  | 2011-08-08 18:02:00 | 1601 | 1 |
| 10 | 2011-08-08 18:02:00 | 1603 | 1 |
| 11 | 2011-08-08 18:02:00 | 1605 | 1 |
| 12 | 2011-08-08 18:02:00 | 1612 | 1 |
| 13 | 2011-08-08 18:03:00 | 1507 | 2 |
| 14 | 2011-08-08 18:03:00 | 1512 | 3 |
| 15 | 2011-08-08 18:03:00 | 1601 | 1 |
| 16 | 2011-08-08 18:03:00 | 1603 | 1 |
| 17 | 2011-08-08 18:03:00 | 1605 | 1 |
| 18 | 2011-08-08 18:03:00 | 1612 | 1 |
| 19 | 2011-08-08 18:04:00 | 1507 | 3 |
| 20 | 2011-08-08 18:04:00 | 1512 | 3 |
| 21 | 2011-08-08 18:04:00 | 1601 | 1 |
| 22 | 2011-08-08 18:04:00 | 1603 | 1 |
| 23 | 2011-08-08 18:04:00 | 1605 | 1 |
| 24 | 2011-08-08 18:04:00 | 1612 | 1 |

DATA PROCESSING APPARATUS, DATA PROCESSING SYSTEM, AND DATA PROCESSING METHOD

BACKGROUND

1. Technical Field

The present invention relates to a data processing apparatus, a data processing system, and a data processing method each of which generates running performance information on a device based on the result of detection of a state of the device.

2. Related Art

Conventionally, in various manufacturing plants etc., running information on a manufacturing device (production equipment) is obtained and a production process is managed based on the running information.

An example of a method for obtaining running information on a manufacturing device is disclosed in Patent Literature 1, which discloses a technique of detecting a running state of a machine by detecting, with a sensor outside the machine, a lightening state of a signal light indicative of a running state of the machine (a signal light indicating that the machine is in operation and a signal light indicating that the machine is at a halt due to abnormality).

Furthermore, Patent Literature 2 discloses a technique of (i) preparing a layout showing a plurality of devices based on images obtained by a camera or cameras capturing the devices and indicators which are mounted on the devices and are indicative of running states of the devices, respectively, (ii) recognizing running information on the devices (colors of indicators) from the images of the indicators, and (iii) displaying the running information on the devices (colors of the indicators) on the layout.

Furthermore, Patent Literature 3 discloses a technique of detecting a state of a manufacturing device based on a signal supplied from the manufacturing device to an output device such as a warning light and a buzzer and calculating periods of times during which individual states continue. Specifically, in the technique disclosed in Patent Literature 3, a period of time from when a buzzer indicating occurrence of abnormality is activated to when the buzzer is deactivated is calculated as an operator moving time, and a period of time from when the buzzer is deactivated to when the manufacturing device starts to operate normally is calculated as a recovery working time.

CITATION LIST

Patent Literatures

[Patent Literature 1]
Japanese Patent Application Publication, Tokukai, No. 2003-091312(Published on Mar. 28, 2003)
[Patent Literature 2]
Japanese Patent Application Publication, Tokukai, No. 2007-114967(Published on May 10, 2007)
[Patent Literature 3]
Japanese Patent Application Publication, Tokukai, No. 2009-080844(Published on Apr. 16, 2009)

SUMMARY

In conventional techniques, it may be difficult to sufficiently obtain running performance information necessary for management of a manufacturing device (such as plotting a running plan and management of running performance).

Specifically, in the techniques of Patent Literatures 1 and 2, information obtainable as a running state of the manufacturing device is limited to the result of detection of a lighting state of a signal light or an indicator, so that the state of the manufacturing device cannot be grasped in details. For example, it is impossible to distinguish a period of time during which an operator did an operational activity on the manufacturing device from a period of time during which the manufacturing device was on standby or to distinguish a period of time during which the manufacturing device carried out a processing process from a period of time during which the operator did an operational activity such as preparation.

In the technique of Patent Literature 3, although the operator moving time and the recovery working time are calculated according to timing of activation and deactivation of a buzzer indicating occurrence of abnormality, obtainable information on a normal state of a device other than when abnormality occurs is similar to those in Patent Literatures 1 and 2.

One or more embodiments of the present invention provides a data processing apparatus, a data processing system, and a data processing method each of which can suitably generate running performance information on a device.

According to one or more embodiments of the present invention, a data processing apparatus for generating running performance information indicative of a running state of at least one device, comprises a data storage process section for obtaining (i) device state information indicative of a result of detection of a state of said at least one device and (ii) operational activity performer information indicative of a result of detection of whether an operational activity performer for doing an operational activity to said at least one device or an operational activity with said at least one device is present at a predetermined position for the operational activity performer to do the operational activity on said at least one device or the operational activity with said at least one device, and causing the device state information and the operational activity performer information to be stored in a result-of-detection storage section; and an analysis section for carrying out a classification process in which the state of said at least one device is classified into a plurality of states including at least (a) a processing state which is a state where said at least one device carried out a predetermined process, (b) an operational activity state which is a state where the operational activity performer did the operational activity on said at least one device or the operational activity with said at least one device, and (c) a standby state which is a state where said at least one device was on standby in accordance with the device state information and the operational activity performer information which have been stored in the result-of-detection storage section, and generating the running performance information including a result of the classification process.

With the arrangement, the data storage process section obtains (i) the device state information indicative of a result of detection of a state of said at least one device and (ii) the operational activity performer information indicative of a result of detection of whether an operational activity performer for doing an operational activity on said at least one device or an operational activity with said at least one device is present at a predetermined position for the operational activity performer to carry out the operational activity on said at least one device or the operational activity with said at least one device, and causes the device state information and the operational activity performer information to be stored in a result-of-detection storage section. Then, the analysis section carries out a classification process in which the state of said at least one device is classified into a plurality of states including at least (a) a processing state which is a state where said at least one device carried out a predetermined process, (b) an operational activity state which is a state where the operational activity performer did the operational activity on said at least one device or the operational activity with said at least one device, and (c) a standby state which is a state where said at least one device was on standby in accordance with the device state information and the operational activity performer information which have been stored in the result-of-detection storage section, and generates the running performance information including a result of the classification process. Thus, the state of said at least one device can be classified into the plurality of states including the processing state, the operational activity state, and the standby state. This allows generating running performance information including information suitable for managing said at least one device.

BRIEF DESCRIPTION OF THE DRAWINGS

FIG. 2 is an explanatory view illustrating an example of the result of detection which is stored in a measured data storage DB of the data processing system illustrated in FIG. 1.

FIG. 3 is an explanatory view illustrating an example of running performance information stored in a running information storage DB of the data processing system illustrated in FIG. 1.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

(1-1. Configuration of Data Processing System 1)

Figure 1:
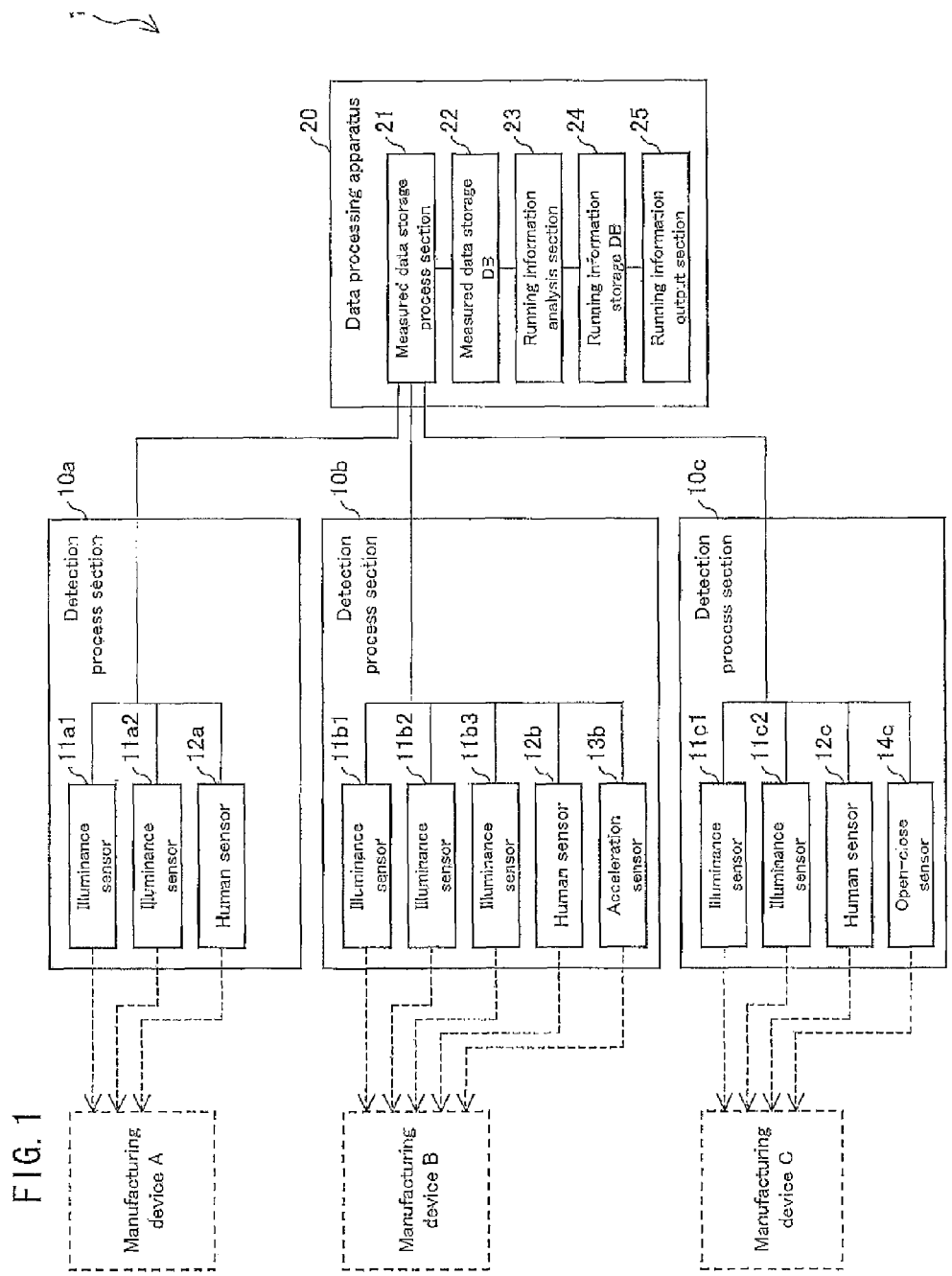
FIG. 1 is a drawing schematically illustrating a configuration of a data processing system in accordance with one or more embodiments of the present invention.

FIG. 1 is a drawing schematically illustrating a configuration of a data processing system 1 in accordance with one or more embodiments of the present invention. As illustrated in FIG. 1, the data processing system 1 includes detection process sections 10a to 10c and a data processing apparatus 20.

The detection process sections 10a to 10c respectively detect states of manufacturing devices A to C and whether operators (operational activity performers) are present at predetermined positions for operating the manufacturing devices A to C, and transmit the results of detection to the data processing apparatus 20. The data processing apparatus 20 analyzes running performances of the manufacturing devices A to C during a past predetermined period based on the results of detection by the detection process sections 10a to 10c. The manufacturing devices A to C respectively include programmable controllers (PLC), and the programmable controllers control operations of the manufacturing devices A to C in accordance with preset manufacturing process programs.

The detection process section 10a includes illuminance sensors (device state detection means) 11a1 and 11a2 and a human sensor (operational activity performer detection means) 12a.

The illuminance sensor 11a1 detects whether a blue signal light (signal light) provided on the manufacturing device A is in a lighting state or an extinct state. The illuminance sensor 11a2 detects whether a yellow signal light provided on the manufacturing device A is in a lighting state or an extinct state. The illuminance sensors 11a1 and 11a2 each detect whether illuminance of light emitted from a signal light to be detected by the illuminance sensor is not less than a predetermined threshold, thereby detecting whether the signal light is in a lighting state or an extinct state. The illuminance sensors 11a1 and 11a2 are not particularly limited in terms of their configurations, and may be various types of conventional and publicly known illuminance sensors. In one or more embodiments of the present invention, the lighting state of the signal light is detected based on the result of detection of illuminance by the illuminance sensor, but the present invention is not limited to this configuration, and the lighting state of the signal light may be detected by another method.

The human sensor 12a detects whether a human (operational activity performer) is present at a predetermined position for an operator (operational activity performer) to do various operational activities on the manufacturing device A or carry out operational activities on a manufacturing target set on the manufacturing device A. In one or more embodiments of the present invention, the human sensor 12a is a sensor configured to detect whether a human is present or not by detecting a change in temperature of a detection target region based on a change in an amount of infrared emitted from the detection target region. However, the human sensor 12a is not limited to this in terms of its configuration, and may be any sensor as long as it can detect whether a human is present at a predetermined position. The operational activity performer is not limited to a human, and may be, for example, a machine such as a robotic worker.

The detection process section 10b includes illuminance sensors (device state detection means) 11b1 and 11b2, a human sensor (operational activity performer detection means) 12b, and an acceleration sensor (device state detection means) 13b.

The illuminance sensor 11b1 detects whether a blue signal light provided on the manufacturing device B is in a lighting state or an extinct state. The illuminance sensor 11b2 detects whether a yellow signal light provided on the manufacturing device B is in a lighting state or an extinct state. The illuminance sensor 11b3 detects whether a red signal light provided on the manufacturing device B is in a lighting state or an extinct state. The illuminance sensors 11b1 to 11b3 may employ the same type of sensors as those for the illuminance sensors 11a1 and 11a2 mentioned above.

The human sensor 12b detects whether a human (operational activity performer) is present at a predetermined position for an operator (operational activity performer) to carry out various operational activities on the manufacturing device B or carry out operational activities on a manufacturing target set on the manufacturing device B. The human sensor 12b may employ the same type of sensors as that for the human sensor 12a. The operational activity performer is not limited to a human, and may be, for example, a machine such as a robotic worker.

The acceleration sensor 13b detects acceleration at the time when a stage (means for supporting a manufacturing target) provided on the manufacturing device B moves. That is, the manufacturing device B includes a stage (movable section) which moves while supporting a manufacturing target, and the acceleration sensor 13b detects acceleration of the stage. The acceleration sensor 13b is not particularly limited in its configuration, and may be, for example, various types of conventional and publicly known acceleration sensors.

The detection process section 10c includes illuminance sensors (device state detection means) 11c1 and 11c2, a human sensor (operational activity performer detection means) 12c, and an open-close sensor (device state detection means) 14c.

The illuminance sensor 11c1 detects whether a blue signal light provided on the manufacturing device C is in a lighting state or an extinct state. The illuminance sensor 11c2 detects whether a yellow signal light provided on the manufacturing device C is in a lighting state or an extinct state. The illuminance sensors 11c1 and 11c2 may employ the same type of sensors as those for the illuminance sensors 11a1 and 11a2 mentioned above.

The human sensor 12c detects whether a human (operational activity performer) is present at a predetermined position for an operator (operational activity performer) to carry out various operational activities on the manufacturing device C or carry out operational activities on a manufacturing target set on the manufacturing device C. The human sensor 12c may employ the same type of sensors as that for the human sensor 12a. The operational activity performer is not limited to a human, and may be, for example, a machine such as a robotic worker.

The open-close sensor (ON/OFF sensor) 14c detects whether an openable door (cover) provided on the manufacturing device C is in an open state or a closed state. How to detect whether the openable door is in an open state or a closed state is not particularly limited, and, for example, various types of conventional and publicly known open-close sensors may be used.

The data processing apparatus 20 includes a measured data storage process section 21, a measured data storage DB 22, a running information analysis section 23, a running information storage DB 24, and a running information output section 25.

The measured data storage process section 21 obtains the results of detections (device state information indicative of results of detections of individual manufacturing devices, and operational activity performer information indicative of results of detections of whether operational activity performers are present at predetermined positions for the manufacturing devices) by individual sensors from the detection process sections 10a to 10c, and causes the results of detections thus obtained to be stored in the measured data storage DB 22 in such a manner that the results of detections are associated with time information indicative of times when the detection processes were carried out. The detection process sections 10a to 10c are connected with the data processing apparatus 20 in such a manner that the detection process sections 10a to 10c can transmit/receive data to/from the data processing apparatus 20 via a transmission medium. The transmission medium is not particularly limited, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network.

The measured data storage DB (result-of-detection storage section) 22 stores the results of detections by sensors provided on the detection process sections 10a to 10c in such a manner that the results of detections are associated with the time information. The measured data storage DB 22 is not particularly limited in terms of its configuration, and may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (including memory card) or an optical card; or a semiconductor memory, such as a mask ROM/EPROM/EEPROM/flash ROM.

FIG. 2 is an explanatory view illustrating an example of the result of detection which is stored in the measured data storage DB 22, showing the result of detection on the manufacturing device C. In the example illustrated in FIG. 2, a measurement time (time information), a detection process section ID for identifying the detection process section, a sensor ID for identifying a sensor, and a detected value are stored in such a manner that they are associated with each other.

In FIG. 2, a detection process section ID "23" corresponds to the detection process section 10c. Furthermore, sensor IDs "778", "781", "1030", and "11788" correspond to the illuminance sensor 11c2, the illuminance sensor 11c1, the human sensor 12c, and the open-close sensor 14c, respectively. The running information analysis section 23 which will be described later determines that a yellow light is in an extinct state when the value detected by the illuminance sensor 11c2 is not more than 6,200, and determines that the yellow light is in a lightening state when the value is more than 6,200. The running information analysis section 23 determines that a blue light is in an extinct state when the value detected by the illuminance sensor 11c1 is not more than 5,700, and determines that the blue light is in a lightening state when the value is more than 5,700. The human sensor 12c outputs a detected value of 1 when a human is present at a predetermined position, and outputs a detected value of 0 when no human is present at the predetermined position. When a detected value of the open-close sensor 14c is not more than 0.5, it is determined that the openable door is closed, and when the detected value of the open-close sensor 14c is more than 0.5, it is determined that the openable door is open.

The running information analysis section (analysis section) 23 generates running performance information indicative of running states (running performances) of individual manufacturing devices during a past predetermined period of time in accordance with the results of detections by respective sensors of the detection process sections 10a to 10c which results are stored in the measurement data storage DB 22, and causes the running performance information to be stored in the running information storage DB 24. How to generate the running performance information will be described later.

The running information storage DB (running information storage section) 24 stores running performance information on individual manufacturing devices which were generated by the running information analysis section 23. The running information storage DB 24 is not particularly limited in terms of its configuration, and may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (including memory card) or an optical card; or a semiconductor memory, such as a mask ROM/EPROM/EEPROM/flash ROM.

FIG. 3 is an explanatory view illustrating an example of running performance information stored in the running information storage DB 24. In the example illustrated in FIG. 3, a time (time information), a device ID for identifying a manufacturing device, and a result of classification of a running state of the corresponding manufacturing device at the time are stored in such a manner that they are associated with each other. A numerical value 1 indicates that the manufacturing device was processing (during a manufacturing process period), a numerical value 2 indicates that an operator was doing an operational activity on the manufacturing device (during an operational activity period), and a numerical value 3 indicates that the manufacturing device was on standby (during a standby period).

The running information output section 25 reads out running performance information stored in the running information storage DB 24, and outputs the running performance information thus read out to other devices such as a display device, a printing device, and an analysis device.

Figure 4:
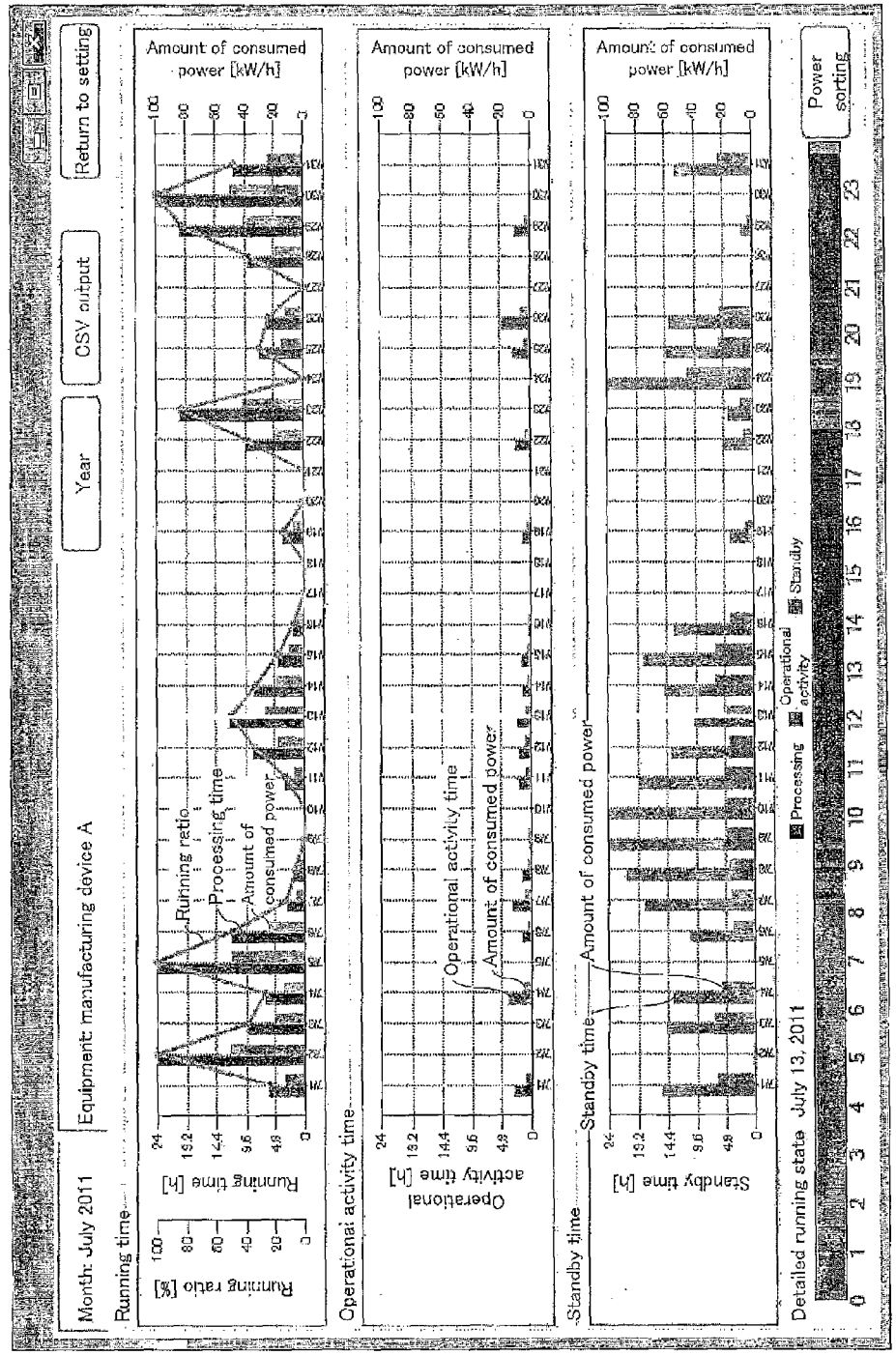
FIG. 4 is an explanatory view illustrating an example of a display screen in a case where a display device displays running performance information generated in the data processing system illustrated in FIG. 1.

FIG. 4 is an explanatory view illustrating an example of a display screen in a case where a display device displays running performance information on the manufacturing device A which is supplied from the running information output section 25. In the example illustrated in FIG. 4, the running information analysis section 23 classifies the running state of the manufacturing device A during past one month (July 2011) into three kinds of periods: processing (manufacturing process period, processing state); operational activity (operational activity period, operational activity state); and standby (standby period, standby state), and causes the display device to display amounts of power consumed by the manufacturing device A during individual periods (individual states). That is, the detection process section 10a includes a power detection section (not shown) for detecting an amount of power consumed by the manufacturing device A, and transmits a result of detection of the amount of consumed power to the data processing apparatus 20. The data processing apparatus 20 calculates a sum of the amounts of consumed power during individual periods in accordance with the results of classification of the running states. How to detect the amount of consumed power is not particularly limited, and the amount may be detected by, for example, measuring electromagnetic waves leaking from a power cable.

Out of four graphs displayed on the display screen illustrated in FIG. 4, a graph at the top shows a running time which is a period of time during which the manufacturing device A was processing (during a manufacturing process period, processing state), a running ratio which is a ratio of the running time to a day (24 hours), and a total amount of consumed power while the manufacturing device A was processing (during a manufacturing process period, processing state) in individual days of past one month (July 2011).

A graph second from the top shows an operational activity time which is a period of time during which an operator was doing an operational activity on the manufacturing device A (during an operational activity period, operational activity state) and a total amount of consumed power while the operator was doing an operational activity on the manufacturing device A (during an operational activity period, operational activity state) in individual days of past one month (July 2011).

A graph third from the top shows a standby time which is a period of time during which the manufacturing device A was on standby (during a standby period) and a total amount of consumed power while the manufacturing device A was on standby (during a standby period) in individual days of past one month (July 2011).

A graph at the bottom shows results of classification of running states at individual times in a day (Jul. 13, 2011) selected by a user in past one month (July 2011).

In one or more embodiments of the present invention, a description will be provided as to an example in which the running performances of the manufacturing devices A to C are analyzed. However, the number and the type of manufacturing devices to be analyzed are not particularly limited and may be changed appropriately.

Individual sensors mentioned above may continuously carry out a detection process or may carry out a detection process at every predetermined period (e.g. every 30 seconds). The periods at which individual sensors carry out the detection processes may be identical with each other or may be different from each other.

Figure 5:
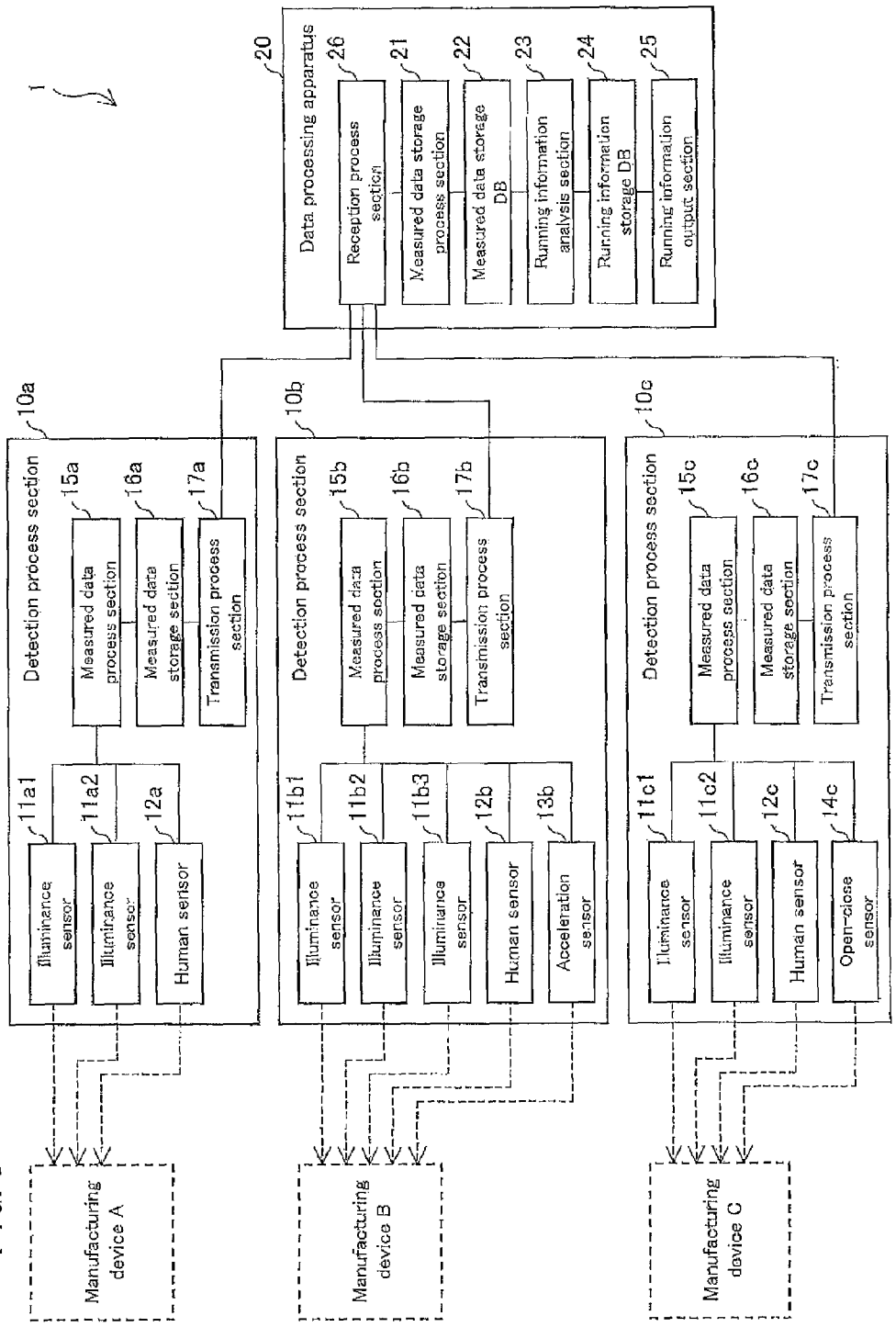
FIG. 5 is a schematic view illustrating a modification of the data processing system illustrated in FIG. 1.

In one or more embodiments of the present invention, the results of detection by the detection process sections 10a to 10c are transmitted to the data processing apparatus 20 in a real-time, and the data processing apparatus 20 causes those results to be stored in the measured data storage DB 22. However, the present invention is not limited to this. For example, one or more embodiments of the present invention may be arranged such that the detection process sections 10a to 10c temporarily store the results of detection therein, and transmits the results to the data processing apparatus 20 at predetermined timing (e.g. at every predetermined transmission period, at a time when a transmission request comes from the data processing apparatus 20 etc.). FIG. 5 is a schematic view illustrating an example of a configuration of the data processing system 1 in this case.

The data processing system 1 illustrated in FIG. 5 is configured such that, in addition to the configuration illustrated in FIG. 1, the detection process sections 10a to 10c respectively include measured data process sections 15a to 15c, measured data storage sections (result-of-detection storage section) 16a to 16c, and transmission process sections 17a to 17c, and the data processing apparatus 20 includes a reception process section 26.

The measured data process sections 15a to 15c respectively cause the results of detection by the sensors of the detection process sections on which the measured data process sections are provided to be stored in the measured data storage sections 16a to 16c in such a manner that the results are associated with time information. The transmission process sections 17a to 17c respectively read out, at predetermined timing, the results of detection stored in the measured data storage sections 16a to 16c, and transmit the results to the data processing apparatus 20. The reception process section 26 receives the results of detection from the detection process sections 10a to 10c and transmits the results thus received to the measured data storage process section 21. Thus, the data processing apparatus 20 carries out a process similar to that of the configuration illustrated in FIG. 1.

Figure 6:
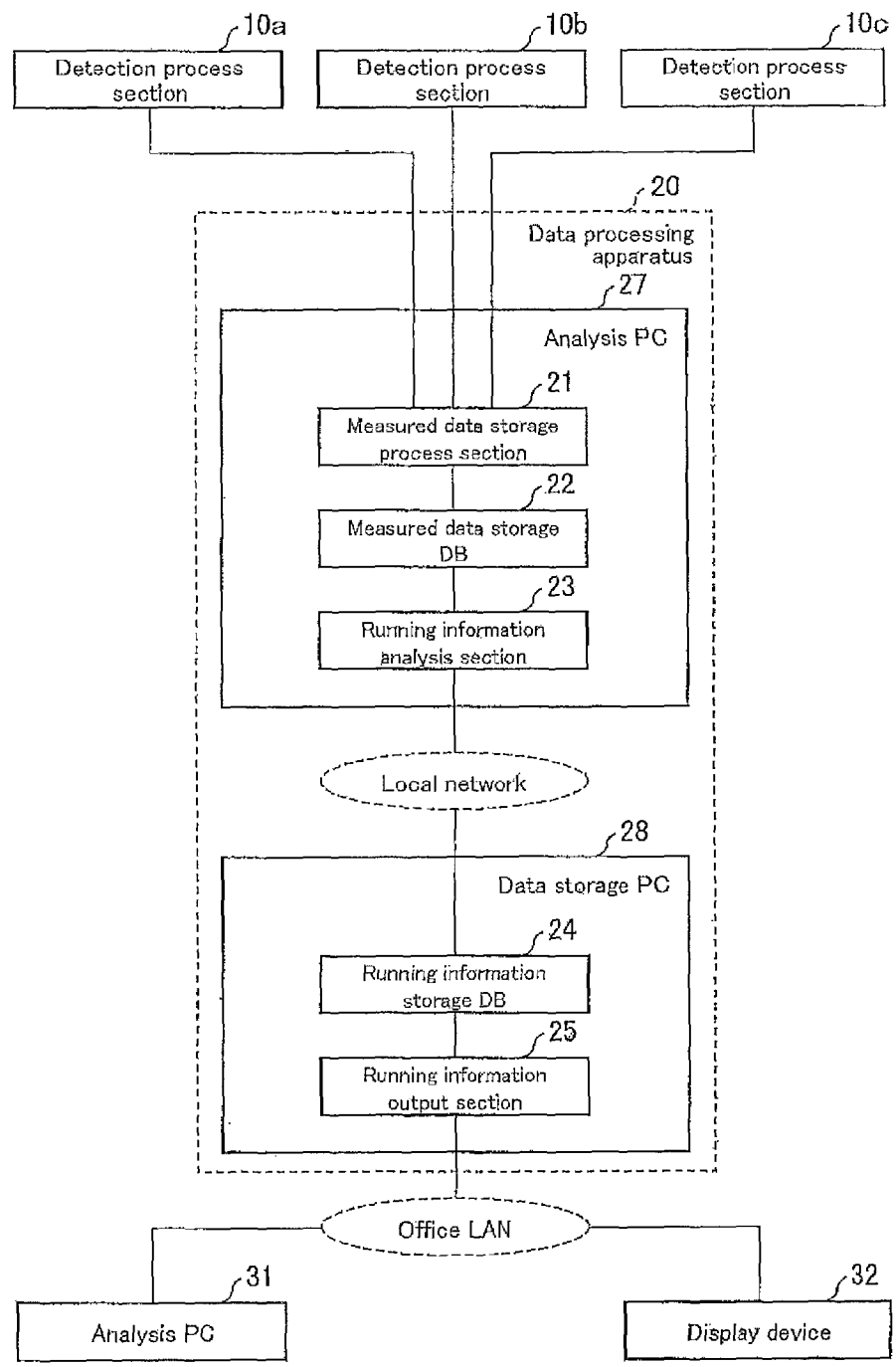
FIG. 6 is a schematic view illustrating a modification of the data processing system illustrated in FIG. 1.

Individual sections of the data processing apparatus 20 are not necessarily included in a single housing. For example, a part of the data processing apparatus 20 and a remaining part thereof may be included in different housings while the housings are communicably connected with each other. FIG. 6 is a schematic view illustrating an example of a configuration in that case.

In the example illustrated in FIG. 6, out of individual sections of the data processing apparatus 20 illustrated in FIG. 1, the measured data storage process section 21, the measured data storage section 22, and the running information analysis section 23 are included in an analysis PC 27, whereas the running information storage section 24 and the running information output section 25 are included in a data storage PC 28. The analysis PC 27 and the data storage PC 28 are communicably connected with each other via a local network in a manufacturing premise (manufacturing plant) where the manufacturing devices A to C are provided. Thus, the analysis PC 27, the data storage PC 28, and the local network constitute the data processing apparatus 20.

(1-2. Process of Generating Running Performance Information)

The following description will discuss a process of generating running performance information on individual manufacturing devices by the running information analysis section 23 of the data processing apparatus 20.

(1-2-1. Process of Generating Running Performance Information on the Manufacturing Device A)

Figure 7:
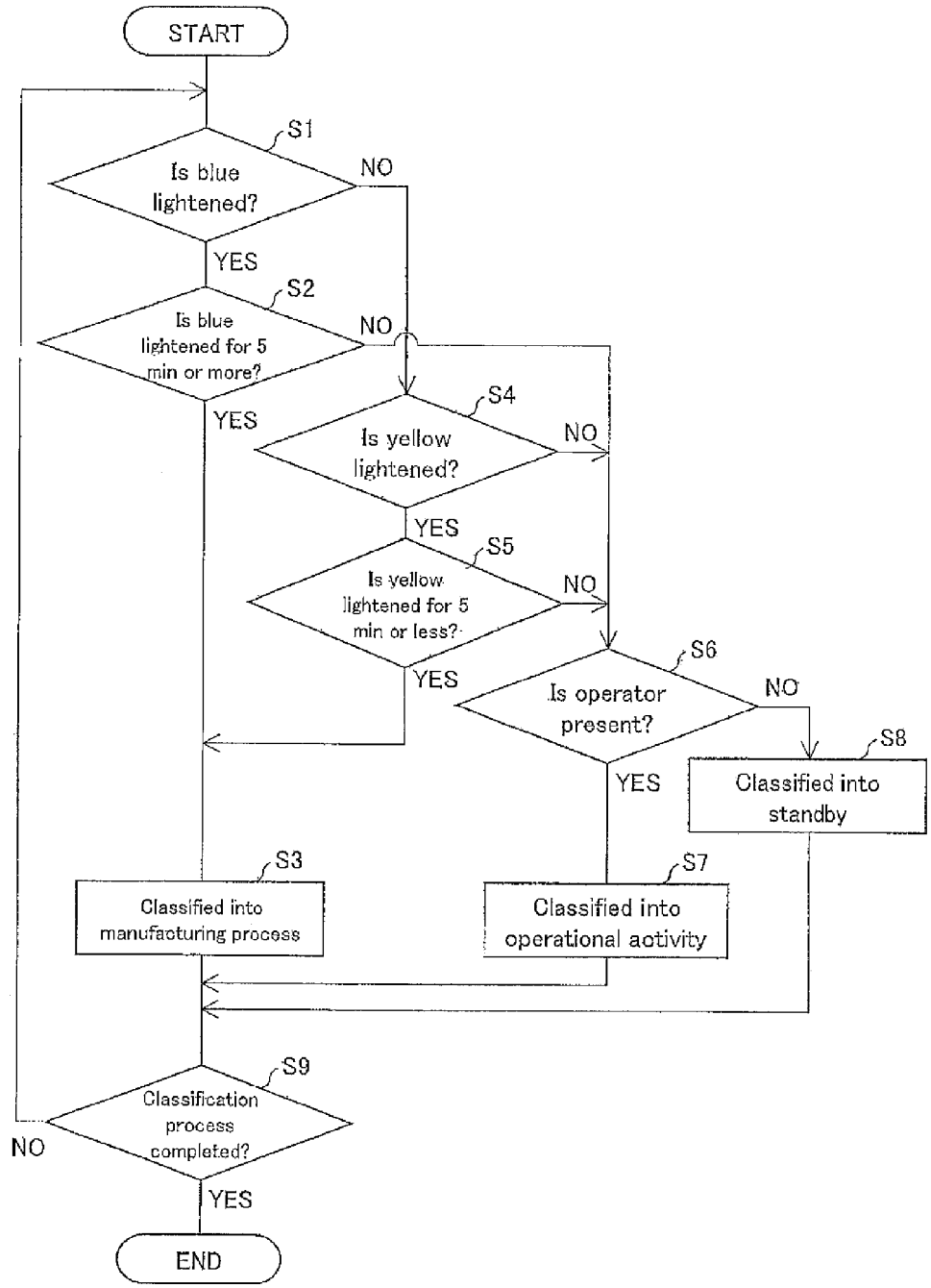
FIG. 7 is a flowchart showing an example of a flow of a process of generating running performance information in the data processing system illustrated in FIG. 1.

FIG. 7 is a flowchart showing a flow of a process of generating running performance information on the manufacturing device A by the running information analysis section 23.

In the manufacturing device A, a blue signal light is lightened while the manufacturing device A carries out a processing process (manufacturing process) under control of a computer (control of a programmable controller) in accordance with a preset manufacturing process program and at a time when the manufacturing device A confirms the manufacturing process program, and the blue signal light is extinct when otherwise. Furthermore, in the manufacturing device A, a yellow signal light is lightened for a period of a manufacturing process which is a period during which the manufacturing device A carries out an operation other than processing (e.g. movement of a processing position, automatic switching of processing conditions etc. in accordance with a manufacturing process program), during an operational activity period during which an operator does an operational activity on the manufacturing device A (e.g. mounting/dismounting of a manufacturing target, various setups of the manufacturing device A), and during a standby period during which the manufacturing device A is on standby, and the yellow signal light is extinct when otherwise.

Initially, when generating running performance information with respect to a predetermined period, the running information analysis section 23 determines whether the blue signal light was lightened or not at a determination target time during the predetermined period in accordance with the result of detection by the illuminance sensor 11a1 which is stored in the measured data storage DB 22 (S1). The determination target time is a time when the running state of the manufacturing device A was to be determined.

When it is determined in S1 that the blue signal light was lightened, the running information analysis section 23 determines whether a period of time during which the blue signal light was continuously lightened, and in which the determination target time was included, was not less than a predetermined time (5 minutes in the present example), in accordance with the result of detection by the illuminance sensor 11a1 which is stored in the measured data storage DB 22 (S2). That is, the running information analysis section 23 determines whether the blue signal light was continuously lightened for not less than the predetermined time, including times before and after the determination target time.

When it is determined in S2 that the blue signal light was continuously lightened for not less than the predetermined time, the running information analysis section 23 classifies each time included in the period during which the blue signal light was continuously lightened into "during a manufacturing process (manufacturing process period, processing state)" (S3).

On the other hand, when it is determined in S1 that the blue signal light was not lightened, the running information analysis section 23 determines whether the yellow signal light was lightened or not at the determination target time, in accordance with the result of detection by the illuminance sensor 11a2 which is stored in the measured data storage DB 22 (S4).

When it is determined in S4 that the yellow signal light was lightened, the running information analysis section 23 determines whether a period of time during which the yellow signal light was continuously lightened, and in which the determination target time was included, was not less than a predetermined time (5 minutes in the present example) (S5). That is, the running information analysis section 23 determines whether the yellow signal light was continuously lightened for not less than the predetermined time, including times before and after the determination target time.

When it is determined in S5 that the yellow signal light was continuously lightened for not more than the predetermined time, the running information analysis section 23 classifies each time included in the period during which the yellow signal light was continuously lightened into "during a manufacturing process (manufacturing process period, processing state)" (S3).

On the other hand, when it is determined in S2 that the blue signal light was not continuously lightened for 5 minutes or more, or when it is determined in S4 that the yellow signal light was not lightened at the determination target time, or when it is determined in S5 that the yellow signal light was lightened for more than the predetermined time, the running information analysis section 23 determines whether an operator was present at a predetermined position at the determination target time, in accordance with the result of detection by the human sensor 12a which is stored in the measured data storage DB 22 (S6). In one or more embodiments of the present invention, when a value indicative of the result of detection by the human sensor 12a at the determination target time is a value indicating that no human was present at the predetermined position and the value was kept for a predetermined time (5 minutes in one or more embodiments of the present invention) or more, the running information analysis section 23 determines that an operator was not present at the predetermined position at the determination target time, and when otherwise, the running information analysis section 23 determines that an operator was present at the predetermined position.

When it is determined in S6 that the operator was present, the running information analysis section 23 classifies the determination target time into "operational activity (during an operational activity period, operational activity state)" (S7). When it is determined in S6 that no operator was present, the running information analysis section 23 classifies the determination target time into "standby (during a standby period, standby state)" (S8).

Thereafter, the running information analysis section 23 determines whether the classification process has been completed with respect to all the times included in the predetermined period (S9). When it is determined that there is still a time which is not yet classified by the classification process, the running information analysis section 23 goes back to the process of S1 and carries out the classification process with respect to a next determination target time, and when it is determined otherwise, the running information analysis section 23 ends the process.

(1-2-2. Process of Generating Running Performance Information on Manufacturing Device B)

Figure 8:
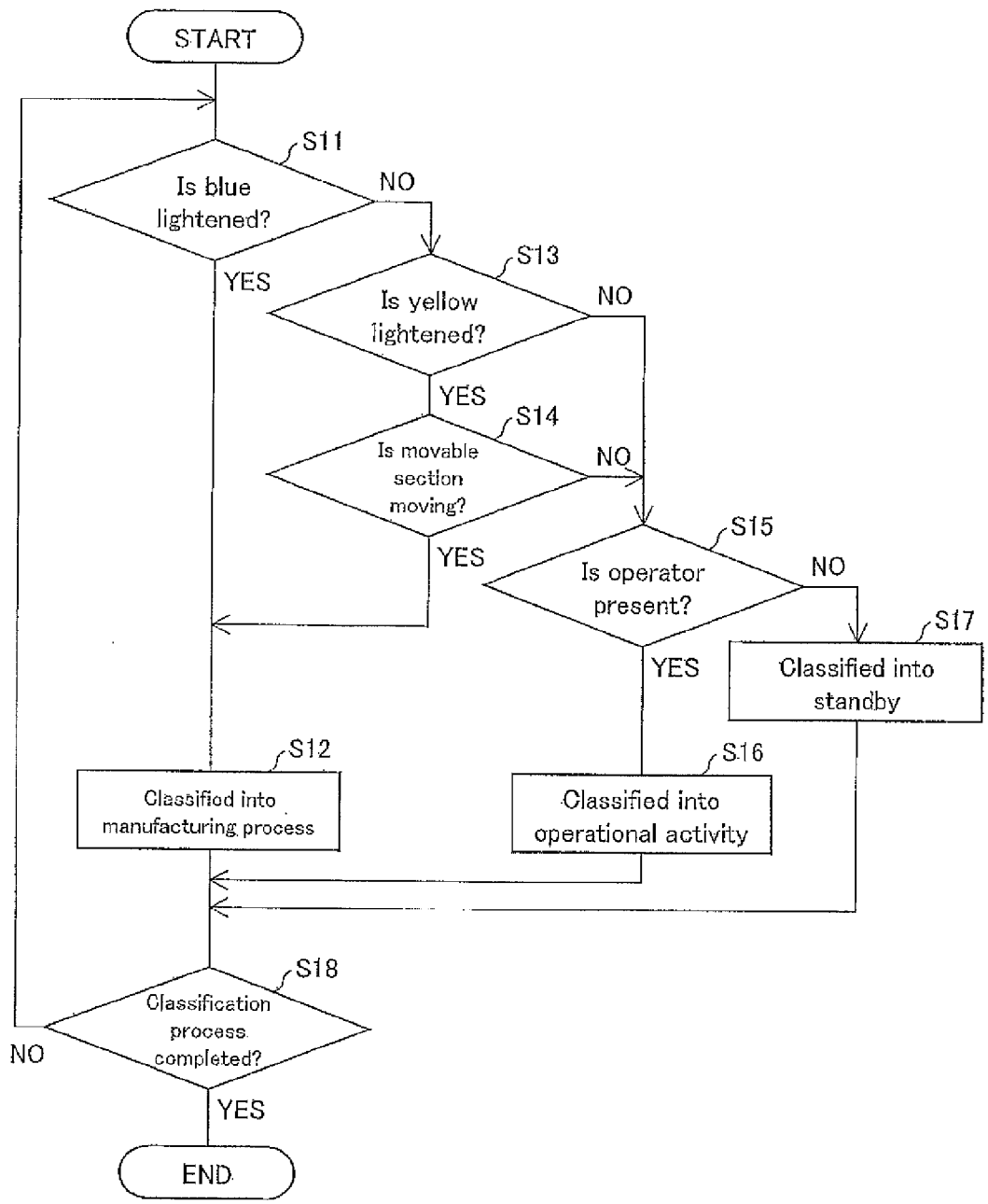
FIG. 8 is a flowchart showing an example of a flow of a process of generating running performance information in the data processing system illustrated in FIG. 1.

FIG. 8 is a flowchart showing a flow of a process of generating running performance information on the manufacturing device B by the running information analysis section 23.

In the manufacturing device B, a blue signal light is lightened while the manufacturing device B carries out a processing process (manufacturing process) under control of a computer (control of a programmable controller) in accordance with a preset manufacturing process program, and the blue signal light is extinct when otherwise. Furthermore, in the manufacturing device B, a yellow signal light is lightened during an operational activity period during which an operator does an operational activity on the manufacturing device B (e.g. manually carries out a processing process (manufacturing process) using the manufacturing device B, various setups of the manufacturing device B), and during a standby period during which the manufacturing device B is on standby, and the yellow signal light is extinct when otherwise. Furthermore, in the manufacturing device B, a red signal light is lightened for a period during which abnormality occurs to the manufacturing device B, and the red signal light is extinct for a period during which no abnormality occurs.

Initially, when generating running performance information with respect to a predetermined period, the running information analysis section 23 determines whether the blue signal light was lightened or not at a determination target time during the predetermined period in accordance with the result of detection by the illuminance sensor 11$b$1 which is stored in the measured data storage DB 22 (S11). The determination target time is a time when the running state of the manufacturing device B was to be determined. As with the example illustrated in FIG. 7, lightening of the blue signal light may be classified into a case where the blue signal light was continuously lightened for a predetermined time (e.g. 5 minutes) or more and other case, and running performance information may be generated in accordance with a result of the classification.

When it is determined in S11 that the blue signal light was lightened, the running information analysis section 23 classifies the determination target time into "during a manufacturing process (manufacturing process period, processing state)" (S12).

On the other hand, when it is determined in S11 that the blue signal light was not lightened, the running information analysis section 23 determines whether the yellow signal light was lightened or not at the determination target time, in accordance with the result of detection by the illuminance sensor 11$b$2 which is stored in the measured data storage DB 22 (S13). As with the example illustrated in FIG. 7, lightening of the yellow signal light may be classified into a case where the yellow signal light was continuously lightened for a predetermined time (e.g. 5 minutes) or more and other case, and running performance information may be generated in accordance with a result of the classification.

When it is determined in S13 that the yellow signal light was lightened, the running information analysis section 23 determines whether a stage (movable section) was moving or not at the determination target time, in accordance with the result of detection by the acceleration sensor 13$b$ which is stored in the measured data storage DB 22 (S14). In one or more embodiments of the present invention, when an absolute value of detected acceleration of the stage was less than 50 mG and the absolute value being less than 50 mG was kept for a predetermined time (30 sec. in one or more embodiments of the present invention) or more, the running information analysis section 23 determines that the stage was at a halt, and when otherwise, the running information analysis section 23 determines that the stage was moving.

When it is determined in S14 that the stage was moving at the determination target time, the running information analysis section 23 classifies the determination target time into "during a manufacturing process (manufacturing process period, processing state)" (S12).

On the other hand, when it is determined in S13 that the yellow signal light was not lightened at the determination target time, or when it is determined in S14 that the stage was not moving at the determination target time, the running information analysis section 23 determines whether an operator was present at a predetermined position at the determination target time, in accordance with the result of detection by the human sensor 12$b$ which is stored in the measured data storage DB 22 (S15). In one or more embodiments of the present invention, when a value indicative of the result of detection by the human sensor 12$a$ at the determination target time is a value indicating that no human was present at the predetermined position and the value was kept for a predetermined time (5 minutes in one or more embodiments of the present invention) or more, the running information analysis section 23 determines that an operator was not present at the predetermined position at the determination target time, and when otherwise, the running information analysis section 23 determines that an operator was present at the predetermined position.

When it is determined in S15 that an operator was present, the running information analysis section 23 classifies the determination target time into "operational activity (during an operational activity period, operational activity state)" (S16). When it is determined in S15 that an operator was not present, the running information analysis section 23 classifies the determination target time into "standby (during a standby period, standby state)" (S17).

Thereafter, the running information analysis section 23 determines whether the classification process has been completed with respect to all the times included in the predetermined period (S18). When it is determined that there is still a time which is not yet classified by the classification process, the running information analysis section 23 goes back to the process of S11 and carries out the classification process with respect to a next determination target time, and when it is determined otherwise, the running information analysis section 23 ends the process.

Figure 9:
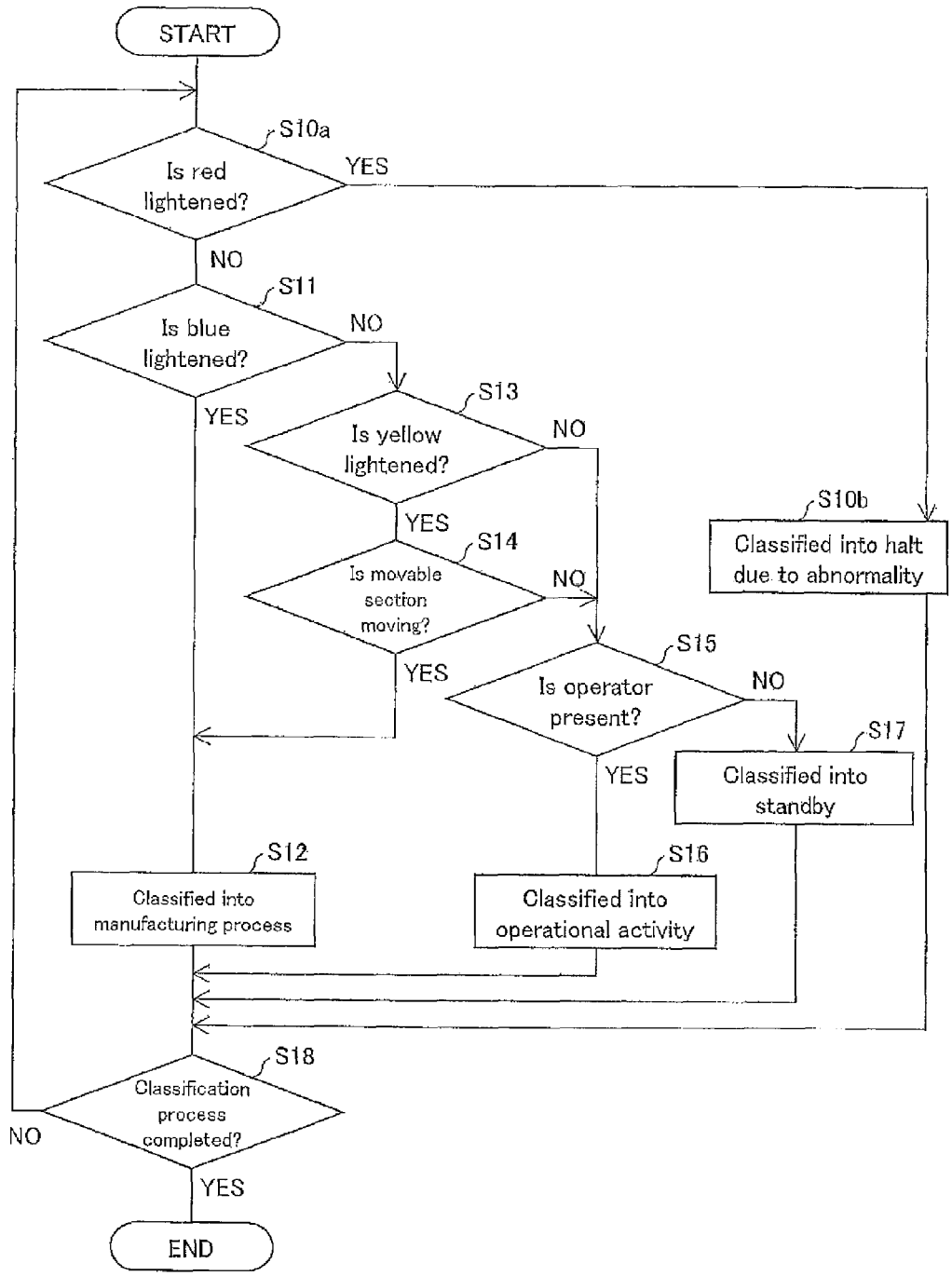
FIG. 9 is a flowchart showing an example of a flow of a process of generating running performance information in the data processing system illustrated in FIG. 1.

In addition to the process illustrated in FIG. 8, there may be carried out a classification process considering a result of detection of a lightening state of a red signal light. FIG. 9 is a flowchart showing an example of a flow of the classification process in that case. For convenience, the same processes as those in FIG. 8 are given the same reference numerals and explanations thereof are omitted.

In the example illustrated in FIG. 9, initially, the running information analysis section 23 determines whether a red signal light was lightened or not at the determination target time, in accordance with the result of detection by the illuminance sensor 11$b$3 which is stored in the measured data storage DB22 (S10$a$). One or more embodiments of the present invention may be arranged such that when a value indicating that the red signal light is lightened was continuously detected for a predetermined period (e.g. 5 minutes) including the determination target time, the running information analysis section 23 determines that the red signal light was lightened, and when otherwise, the running information analysis section 23 determines that the red signal light was not lightened.

When it is determined in S10a that the red signal light was lightened at the determination target time, the running information analysis section 23 classifies the determination target time into "abnormal (abnormal period, abnormal state)" (S10b), and goes to the process of S18. When it is determined in S10a that the red signal light was not lightened at the determination target time, the running information analysis section 23 goes to the process of S11. The process of S11 and subsequent processes are the same as those in FIG. 8.

(1-2-3. Process of Generating Running Performance Information on Manufacturing Device C)

Figure 10:
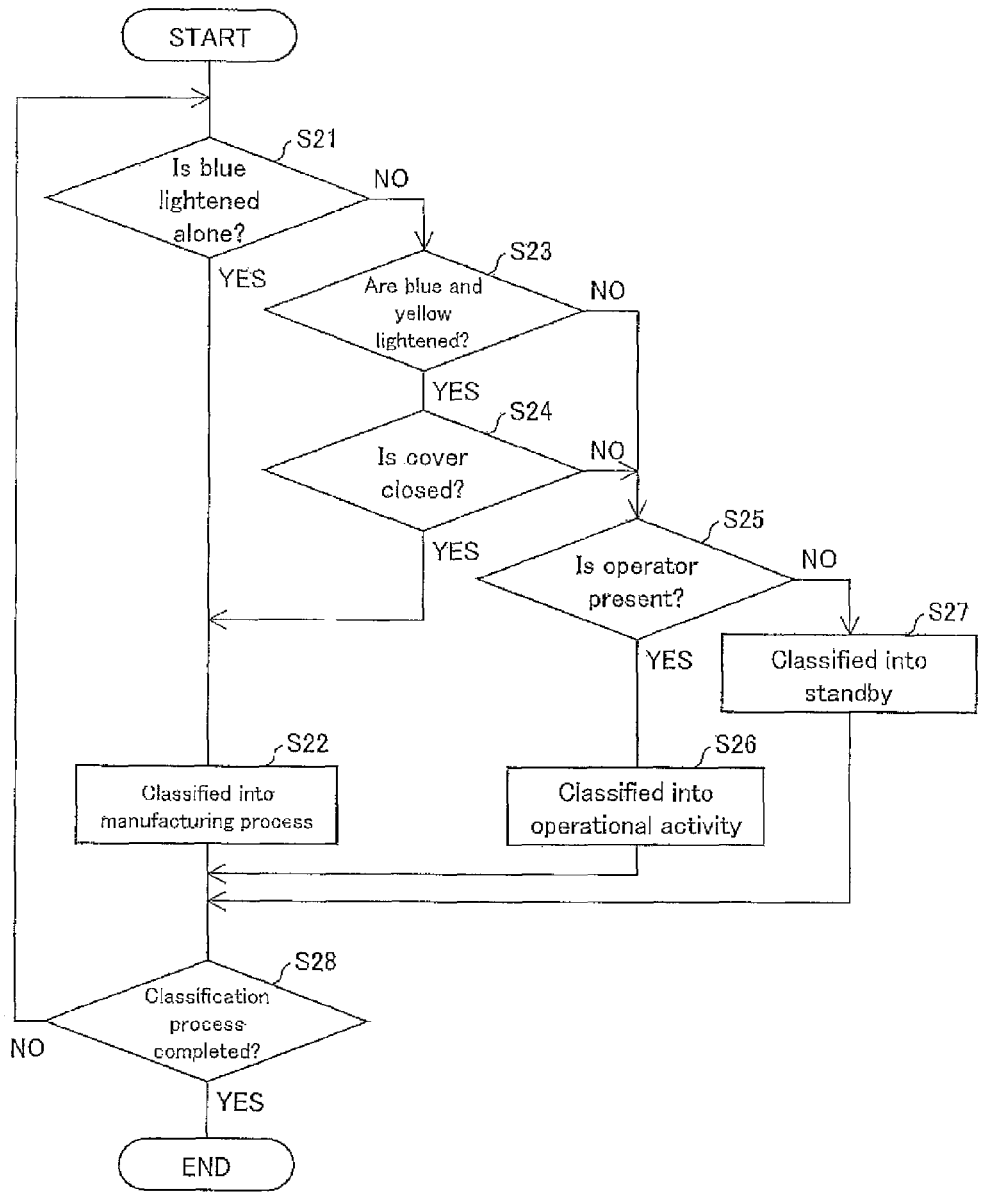
FIG. 10 is a flowchart showing an example of a flow of a process of generating running performance information in the data processing system illustrated in FIG. 1.
Figure 11:
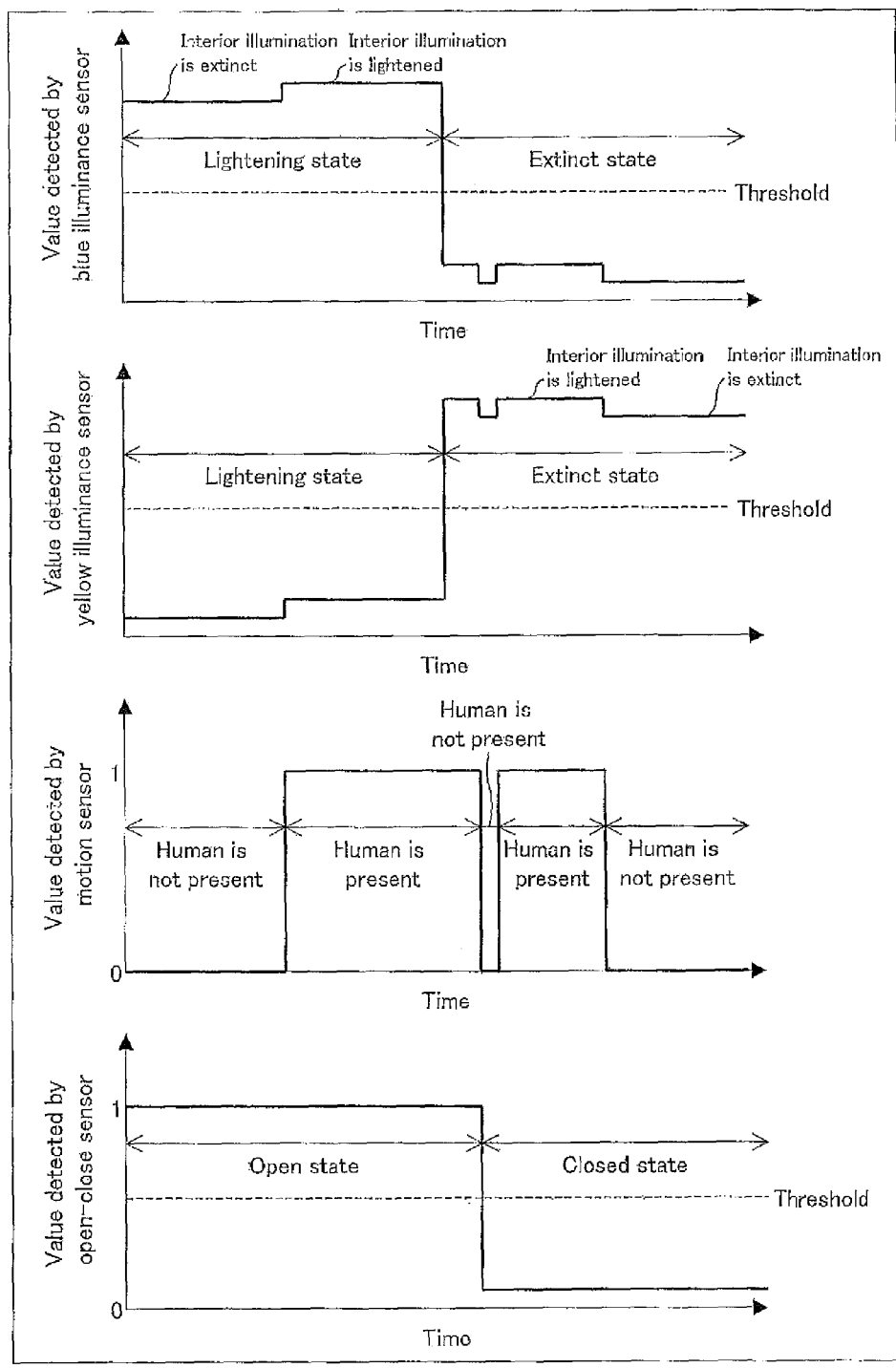
FIG. 11 is an explanatory view illustrating examples of results of detection which are stored in a measured data storage DB of the data processing system illustrated in FIG. 1.

FIG. 10 is a flowchart showing a flow of a process of generating running performance information on the manufacturing device C by the running information analysis section 23. FIG. 11 is an explanatory view illustrating examples of results of detection by the illuminance sensor (blue illuminance sensor) 11c1, the illuminance sensor (yellow illuminance sensor) 11c2, the human sensor 12c, and the open-close sensor 14c which are included in the detection process section 10c. The results are stored in the measured data storage DB 22.

In the manufacturing device C, a blue signal light is lightened while the manufacturing device C carries out a processing process (manufacturing process) under control of a computer (control of a programmable controller) in accordance with a preset manufacturing process program, and the blue signal light is extinct when otherwise. Furthermore, in the manufacturing device C, a yellow signal light is lightened during an operational activity period during which an operator does an operational activity on the manufacturing device C (e.g. mounting/dismounting of a manufacturing target, various setups of the manufacturing device C), and during a standby period during which the manufacturing device C is on standby, and the yellow signal light is extinct when otherwise. Furthermore, in the manufacturing device C, both of the blue signal light and the yellow signal light are lightened for a period during which the manufacturing device C confirms the manufacturing process program.

Initially, when generating running performance information with respect to a predetermined period, the running information analysis section 23 determines whether the blue signal light was lightened alone or not at a determination target time during the predetermined period in accordance with the results of detection by the illuminance sensors 11c1 and 11c2 which are stored in the measured data storage DB 22 (S21). The determination target time is a time when the running state of the manufacturing device C is to be determined. FIG. 11 is an explanatory view illustrating examples of values detected by individual sensors which values are stored in the measured data storage DB 22. As illustrated in the graph at the top of FIG. 11, when the value detected by the illuminance sensor 11c1 is larger than a threshold, the running information analysis section 23 determines that the blue signal light was lightened, and when the value is not larger than the threshold, the running information analysis section 23 determines that the blue signal light was extinct. Furthermore, as illustrated in the graph second from the top of FIG. 11, when the value detected by the illuminance sensor 11c2 is larger than a threshold, the running information analysis section 23 determines that the yellow signal light was lightened, and when the value is not larger than the threshold, the running information analysis section 23 determines that the yellow signal light was extinct.

The threshold for the blue signal light and the threshold for the yellow signal light may be identical with each other or different from each other.

When it is determined in S21 that the blue signal light was lightened alone, the running information analysis section 23 classifies the determination target time into "during a manufacturing process (manufacturing process period, processing state)" (S22).

On the other hand, when it is determined in S21 that the blue signal light was not lightened alone (signal light of other color was also lightened or the blue signal light was not lightened), the running information analysis section 23 determines whether the blue signal light and the yellow signal light were lightened at the determination target time, in accordance with the results of detection by the illuminance sensors 11c1 and 11c2 which are stored in the measured data storage DB 22 (S23).

When it is determined in S23 that the blue signal light and the yellow signal light were lightened, the running information analysis section 23 determines whether the openable door (cover) of the manufacturing device C was opened or not at the determination target time, in accordance with a result of detection by the open-close sensor 14c which is stored in the measured data storage DB 22 (S24). Specifically, in one or more embodiments of the present invention, the open-close sensor 14c detects a value of a voltage corresponding to an open/closed state of the openable door. As illustrated in the graph at the bottom of FIG. 11, when the value detected by the open-close sensor 14c is less than a preset threshold (0.1 V in one or more embodiments of the present invention), the running information analysis section 23 determines that the openable door was open, and when the value is not less than the threshold, the running information analysis section 23 determines that the openable door was closed.

When it is determined in S24 that the openable door was closed at the determination target time, the running information analysis section 23 classifies the determination target time into "during a manufacturing process (manufacturing process period, processing state)" (S22).

On the other hand, when it is determined in S23 that both of the blue signal light and the yellow signal light were not lightened at the determination target time (when it is determined in S23 that at least one of the blue signal light and the yellow signal light was not lightened), or when it is determined in S24 that the openable door was opened at the determination target time, the running information analysis section 23 determines whether an operator was present at a predetermined position at the determination target time, in accordance with a result of detection by the human sensor 12b which is stored in the measured data storage DB 22 (S25). Specifically, as illustrated in the graph third from the top illustrated in FIG. 11, when a value detected by the human sensor 12c is 1, the running information analysis section 23 determines that a human was present at the predetermined position, and when the value is 0, the running information analysis section 23 determines that a human was not present at the predetermined position. When the value indicative of the result of detection by the human sensor 12b at the determination target time was the value 0 indicating that a human was not present at the predetermined position and when the value 0 was kept for a predetermined period (5 minutes in one or more embodiments of the present invention) or more, the running information analysis section 23 determines that an operator was not present at the predetermined position at the determination target time, and when otherwise, the running information analysis section 23 determines that an operator was present at the predetermined position.

When it is determined in S25 that an operator was present, the running information analysis section 23 classifies the determination target time into "operational activity (during an operational activity period, operational activity state)" (S26). When it is determined in S25 that an operator was not present, the running information analysis section 23 classifies the determination target time into "standby (during a standby period, standby state)" (S27).

Subsequently, the running information analysis section 23 determines whether the classification process has been completed with respect to all the times included in the predetermined period (S28). When the running information analysis section 23 determines that there is still a time which is not yet classified by the classification process, the running information analysis section 23 goes back to the process of S11 and carries out the classification process with respect to a next determination target time, and when the running information analysis section 23 determines otherwise, the running information analysis section 23 ends the process.

(1-3. Summary)

As described above, in the data processing system 1 in accordance with one or more embodiments of the present invention, the running information analysis section 23 carries out the classification process in which the states of the manufacturing devices A to C at each period in a predetermined period are classified into a plurality of states including (a) a manufacturing process state which is a state where the manufacturing device carried out a manufacturing process, (b) an operational activity state which is a state where an operator (operational activity performer) did an operational activity on the manufacturing device or an operational activity with the manufacturing device, and (c) a standby state which is a state where the manufacturing device was on standby, in accordance with results of detections by the detection process sections 10a to 10c on device states of the manufacturing devices A to C (lightening state of each signal light, movement state of the movable section, open-closed state of openable door, etc.) and results of detections by the human sensors 12a to 12c on whether an operator is present at a predetermined position for doing operational activities on the manufacturing devices A to C or operational activities with the manufacturing devices A to C, and the running information analysis section 23 generates the running performance information including a result of the classification process.

This allows generating suitable running performance information according to an actual running condition of a manufacturing device, compared to a case where running performance condition is generated according to only a lightening state of a signal light provided on a manufacturing device. That is, it is possible to generate running performance information indicative of running performance of the manufacturing device in more details and more precisely.

Specifically, a state where a blue signal light indicating that a manufacturing device is carrying out a manufacturing process was lightened can be classified into a period during which the manufacturing device actually carried out a manufacturing process (manufacturing process period, processing state) and a period during which an operator did an operational activity such as preparation (operational activity period, operational activity state), in accordance with a period during which the blue signal light was continuously lightened. Furthermore, a period during which the manufacturing device did not carried out the manufacturing process can be classified into a period during which the operator did an operational activity such as preparation (operational activity period, operational activity state) and a period during which the operator did not do an operational activity but the manufacturing device was on standby (standby period, standby state), in accordance with lightening states of signal lights of individual colors and whether an operator was present or not. Furthermore, in accordance with lightening states of signal lights of individual colors and whether an operator was present or not, it is possible to distinguish a period from when the manufacturing device is stopped to when an operator comes (standby period, standby state) from a period during which an operator actually does an operational activity (operational activity period, operational activity state).

Furthermore, use of detailed and precise running performance information generated by the data processing system 1 in accordance with one or more embodiments of the present invention allows, for example, (i) drawing up an effective device running plan considering a processing time (manufacturing process time) necessary for processing (manufacturing process) and a time for preparation by an operator (operational activity time) and (ii) planning a measure for improving a running ratio in order to reduce a wasteful preparation time and a wasteful standby time.

Furthermore, the data processing system 1 in accordance with one or more embodiments of the present invention is only required to include detection means (illuminance sensor, acceleration sensor, open-close sensor etc.) for detecting a device state of a manufacturing device, a detection process section including detection means (human sensor etc.) for detecting whether an operator is present or not, and a data processing apparatus for analyzing a result of detection by each detection means. Consequently, for example, even in a case of generating running performance information on existing manufacturing equipment, it is unnecessary to change an arrangement of the existing manufacturing equipment, so that it is possible to generate running performance information easily.

In one or more embodiments of the present invention, the detection process sections 10a to 10c are configured to detect lightening states of signal lights provided on the corresponding manufacturing devices A to C. However, the present invention is not limited to this configuration, and may be arranged such that a device state of a manufacturing device is detected in accordance with a factor other than a lightening state of a signal light. For example, one or more embodiments of the present invention may be arranged such that an operation state of a manufacturing device is detected in accordance with a movement state of a movable section provided on the manufacturing device, an amount of power consumed by the manufacturing device (amount of power supplied to the manufacturing device), a state of temperature of a predetermined portion of the manufacturing device, a state of pressure applied on a predetermined portion of the manufacturing device, or combinations thereof.

Furthermore, in one or more embodiments of the present invention, a description was made as to a configuration in which acceleration is detected as the operation state of a movable section of a manufacturing device. However, the present invention is not limited to this configuration. For example, one or more embodiments of the present invention may be arranged such that instead of acceleration or in addition to acceleration, a movement velocity or a displacement amount of the movable section is detected and a period during which a result of the detection was kept to be less than a predetermined value for a predetermined period is classified into a halt period during which the manufacturing device was at a halt (e.g. period during which the manufacturing device was shut down by turning power off).

Furthermore, in a case where a manufacturing device includes support means for supporting a manufacturing target (work), one or more embodiments of the present invention may be arranged so as to detect a support state of the support means and to determine a state of the manufacturing device in accordance with a result of the detection. The support state may be detected in such a manner that, for example, in a case where the support means is a magnet chuck, a power to grip the manufacturing target by the support means is detected by detecting a magnetic force, and in a case where the support means is a mechanical chuck, a power to grip the manufacturing target by the support means is detected by a strain sensor or a displacement sensor. By detecting the support state of the support means, it is possible to detect presence/absence of the manufacturing target and to classify the standby state into a preparation standby period (manufacturing preparation period during which the manufacturing device was on standby while the support means supported the manufacturing target or while mounting of the manufacturing target onto the support means or dismounting of the manufacturing target from the support means was being performed) and a pre-step standby period (period during which the manufacturing device was on standby while the support means did not support the manufacturing target and neither of mounting of the manufacturing target onto the support means nor dismounting of the manufacturing target from the support means was being performed).

Furthermore, one or more embodiments of the present invention may be arranged such that the measured data storage process section 21 of the data processing apparatus 20 causes results of measurements from individual detection process sections to be stored in the measured data storage DB 22 and supplies the results to the running information output section 25, and the running information output section 25 generates an image according to the results of measurements, supplies the image to a display device, and causes the display device to display the image. This allows monitoring current states of the manufacturing devices in real time.

Figure 12:
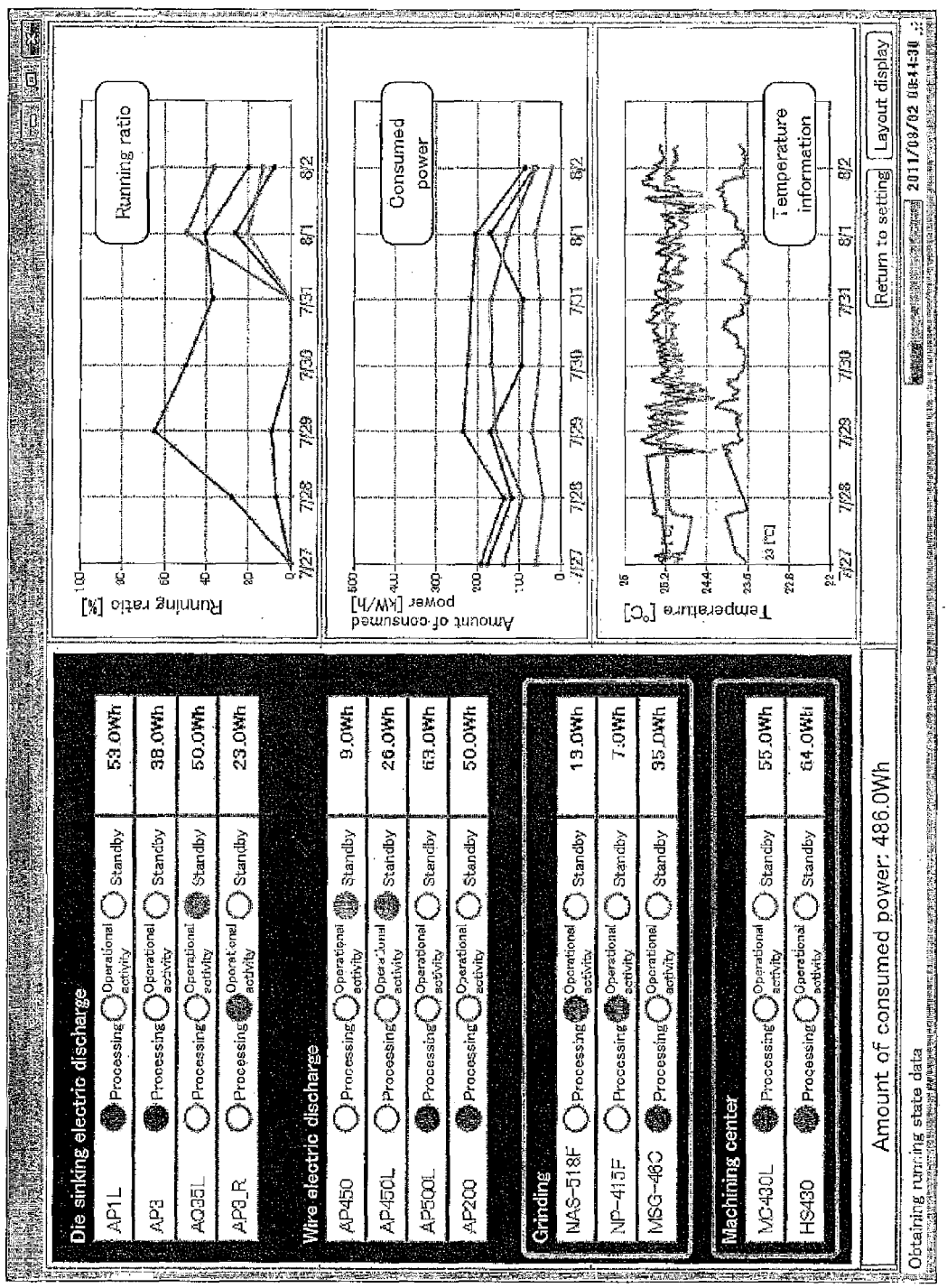
FIG. 12 is an explanatory view illustrating an example of a display screen which displays an image indicating current states of manufacturing devices in the data processing system illustrated in FIG. 1.

Alternatively, one or more embodiments of the present invention may be arranged such that the measured data storage process section 21 of the data processing apparatus 20 causes results of measurements from individual detection process sections to be stored in the measured data storage DB 22 and supplies the results to the running information analysis section 23, the running information analysis section 23 determines current states of the manufacturing devices and supplies the results of determinations to the running information output section 25, and the running information output section 25 generates an image showing the current states of the manufacturing devices, supplies the image to a display device, and causes the display device to display the image. The running information analysis section 23 determines the current states of the manufacturing devices in accordance with results of past detections by the detection process sections which results are stored in the measured data storage DB 22 and results of current detections by the detection process sections. A method for the determination may be substantially the same as the aforementioned method for generating running performance information on the manufacturing devices during a past predetermined period. FIG. 12 is an explanatory view illustrating an example of a display screen which displays an image indicating current states of the manufacturing devices. The example illustrated in FIG. 12 displays results of the running information analysis section 23 classifying current states of the manufacturing devices into one of "processing", "operational activity", and "standby" in accordance with results of detections by sensors provided on the manufacturing devices and amounts of power consumed by the manufacturing devices.

In one or more embodiments of the present invention, sections (blocks) included in the data processing apparatus 20, particularly a part of or all of the measured data storage process section 21, the running information analysis section 23, the running information output section 25, and the reception process section 26 may be realized by software as executed by a processor such as a CPU. In this case, the data processing apparatus 20 includes: a CPU (Central Processing Unit) that executes instructions of a control program that is software realizing the foregoing functions; ROM (Read Only Memory) or a storage device (storage medium) storing the program and various kinds of data; and RAM (Random Access Memory) that develops the program. According to one or more embodiments of the present invention, the data processing apparatus 20 is provided with a computer-readable storage medium for storing program codes (such as executable program, intermediate code program, and source program) of the control program of the data processing apparatus 20 which program serves as software for realizing the functions, and a computer (or a CPU or an MPU) reads and executes the program stored in the storage medium.

The storage medium is, for example, tapes such as a magnetic tape and a cassette tape, or discs such as magnetic discs (e.g. a floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the data processing apparatus 20 may be arranged so as to be connectable to a communication network so that the program code is supplied to the data processing apparatus 20 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that one or more embodiments of the present invention can be also realized by the program codes in the form of a computer data signal embedded in a carrier wave, which is the program that is electrically transmitted.

The sections of the data processing apparatus 20 may be realized by hardware logic instead of software. The sections of the data processing apparatus 20 may be each a combination of hardware for executing a part of a process and calculation means for executing software for implementing a control of the hardware and a remaining part of the process.

Above, a description was made as to a case where running performance information on a manufacturing device is generated. However, a target of which running performance information is generated is not limited to a manufacturing device and may be various kinds of devices.

The present invention is not limited to the description of the embodiments above, but may be altered by a skilled person within the scope of the claims. An embodiment based on a proper combination of technical means disclosed in different embodiments is encompassed in the technical scope of the present invention.

As described above in details, a data processing apparatus according to one or more embodiments of the present invention is a data processing apparatus for generating running performance information indicative of a running state of at least one device, including: a data storage process section for obtaining (i) device state information indicative of a result of detection of a state of said at least one device and (ii) operational activity performer information indicative of a result of detection of whether an operational activity performer for doing an operational activity on said at least one device or an operational activity with said at least one device is present at a predetermined position for the operational activity performer to carry out the operational activity on said at least one device or the operational activity with said at least one device, and causing the device state information and the operational activity performer information to be stored in a result-of-detection storage section; and an analysis section for carrying out a classification process in which the state of said at least one device is classified into a plurality of states including at least (a) a processing state which is a state where said at least one device carried out a predetermined process, (b) an operational activity state which is a state where the operational activity performer did the operational activity on said at least one device or the operational activity with said at least one device, and (c) a standby state which is a state where said at least one device was on standby in accordance with the device state information and the operational activity performer information which have been stored in the result-of-detection storage section, and generating the running performance information including a result of the classification process. Examples of the operational activity state include a state where the operational activity performer was mounting/dismounting a processing target on/from a device, a state where the operational activity performer was setting a processing program for a device, and a state where the operational activity performer was manually operating a device.

With the arrangement, the data storage process section obtains device state information indicative of a result of detection of a state of said at least one device, and operational activity performer information indicative of a result of detection on whether the operational activity performer for doing an operational activity on said at least one device or an operational activity with said at least one device is present at a predetermined position for such an operational activity, and causes the device state information and the operational activity performer information to be stored in the result-of-detection storage section. Then, the analysis section carries out the classification process in which the state of said at least one device is classified into a plurality of states including at least (a) a processing state which is a state where said at least one device carried out a predetermined process, (b) an operational activity state which is a state where the operational activity performer did the operational activity on said at least one device or the operational activity with said at least one device, and (c) a standby state which is a state where said at least one device was on standby in accordance with the device state information and the operational activity performer information which have been stored in the result-of-detection storage section, and generates the running performance information including a result of the classification process. This allows classifying the state of said at least one device into the plurality of states including the processing state, the operational activity state, and the standby state. This allows generating running performance information including information suitable for managing said at least one device.

The data processing apparatus according to one or more embodiments of the present invention may be arranged such that the analysis section classifies the state of said at least one device into the processing state and other states in accordance with the device state information, and further classifies said other states into the operational activity state and the standby state in accordance with the operational activity performer information.

With the arrangement, it is possible to classify the state of the device into the processing state, the operational activity state, and the standby state.

The data processing apparatus according to one or more embodiments of the present invention may be arranged such that the analysis section classifies the state of said at least one device into the processing state, an abnormal state where an abnormality occurred in said at least one device, and other states in accordance with the device state information, and further classifies said other states into the operational activity state and the standby state in accordance with the operational activity performer information.

With the arrangement, it is possible to classify the state of said at least one device into the processing state, the abnormal state, the operational activity state, and the standby state.

The data processing apparatus according to one or more embodiments of the present invention may be arranged such that the analysis section classifies the state of said at least one device into the processing state, a halt state where said at least one device was at a halt, and other states in accordance with the device state information, and further classifies said other states into the operational activity state and the standby state in accordance with the operational activity performer information.

With the arrangement, it is possible to classify the state of said at least one device into the processing state, the halt state, the operational activity state, and the standby state.

The data processing apparatus according to one or more embodiments of the present invention may be arranged such that the analysis section classifies the state of said at least one device into the processing state, an abnormal state where an abnormality occurred in said at least one device, a halt state where said at least one device was at a halt, and other states in accordance with the device state information, and further classifies said other states into the operational activity state and the standby state in accordance with the operational activity performer information.

With the arrangement, it is possible to classify the state of said at least one device into the processing state, the abnormal state, the halt state, the operational activity state, and the standby state.

The data processing apparatus according to one or more embodiments of the present invention may be arranged such that the device state information includes support state information indicative of a result of detection of a support state of support means for supporting a processing target provided on said at least one device, and the analysis section classifies the standby state into (I) a preparation state which is a state where the support means supported the processing target or a state where said at least one device was on standby while mounting of the processing target onto the support means or dismounting of the processing target from the support means was being performed and (II) a pre-step standby state which is a state where said at least one device was on standby while the support means did not support the processing target and neither of mounting of the processing target onto the support means nor dismounting of the processing target from the support means was being performed.

With the arrangement, it is possible to further classify the standby state into the preparation state and the pre-step standby state.

The data processing apparatus according to one or more embodiments of the present invention may be arranged such that the analysis section classifies, into the operational activity state, a period which is in said other states and during which presence of the operational activity performer at the predetermined position was continuously detected for a predetermined period or more, and the analysis section classifies, into the standby state, a period which is in said other states and during which presence of the operational activity performer at the predetermined position was not continuously detected for the predetermined period or more.

With the arrangement, it is possible to prevent a human or an object who (which) is in fact not an operational activity performer from being wrongly recognized as an operational activity performer. Examples of the human or the object who (which) is in fact not an operational activity performer include an object having passed through the predetermined position or an object having been temporarily present at the predetermined position. Accordingly, it is possible to generate more suitable running performance information.

The data processing apparatus one or more embodiments of the present invention may be arranged such that the device state information includes lighting state information indicative of a result of detection of a lighting state of a signal light which indicates a state of said at least one device, the signal light being provided on said at least one device, and the analysis section carries out the classification process in accordance with the result of detection of the lighting state.

The data processing apparatus according to one or more embodiments of the present invention may be arranged such that the signal light discernibly indicates whether said at least one device is in the processing state in which said at least one device carries out the predetermined process, the analysis section classifies, into the processing state, a period during which the lightening state was continued for a predetermined period or more, the analysis section classifies, into the operational activity state, a period during which the lightening state was not continued for the predetermined period or more and during which the operational activity performer was present at the predetermined position or presence of the operational activity performer at the predetermined position was continuously detected for a predetermined period or more, and the analysis section classifies, into the standby state, a period during which the lightening state was not continued for the predetermined period or more and which is in a state other than the operational activity state.

With the arrangement, it is possible to carry out the classification process in accordance with the lightening state of the signal light provided on said at least one device.

The data processing apparatus according to one or more embodiments of the present invention may be arranged such that the device state information includes movable section information indicative of a result of detection of a movement state of a movable section provided on said at least one device, and the analysis section carries out the classification process in accordance with the movable section information.

The data processing apparatus according to one or more embodiments of the present invention may be arranged such that, for example, the analysis section classifies, into the halt state where said at least one device was at a halt, a period during which a movement velocity, acceleration, or a displacement amount of the movable section was kept to be less than a predetermined value for a predetermined period.

With the arrangement, it is possible to carry out the classification process on each period included in the predetermined period, in accordance with the movement state of the movable section of the device.

The data processing apparatus according to one or more embodiments of the present invention may be arranged such that the device state information includes consumed power information indicative of a result of detection of power consumed by said at least one device, and the analysis section carries out the classification process in accordance with the consumed power information.

With the arrangement, it is possible to carry out the classification process in accordance with the power consumed by said at least one device.

The data processing apparatus according to one or more embodiments of the present invention may be arranged such that the data storage process section obtains the device state information and the operational activity performer information with respect to a plurality of devices, in which are said at least one device, and causes the device state information and the operational activity performer information to be stored in the result-of-detection storage section, and the analysis section generates the running performance information with respect to each of the plurality of devices.

With the arrangement, it is possible to generate running performance information with respect to the plurality of devices.

The data processing apparatus according to one or more embodiments of the present invention may be arranged such that the plurality of devices include different types of devices, and for each of the different types of devices, the analysis section sets a method for the classification process individually.

With the arrangement, it is possible to carry out the classification process individually for each of the different types of devices by a method according to said each of the different types of devices.

The data processing apparatus according to one or more embodiments of the present invention may be arranged such that the data processing apparatus further includes a display device, the analysis section classifies a current state of said at least one device into the plurality of states in accordance with (A) past one of the device state information and past one of the operational activity performer information which are stored in the result-of-detection storage section and (B) current one of the device state information and current one of the operational activity performer information which are obtained by the data storage process section, and the display device displays a result of classification by the analysis section of the current state of said at least one device.

With the arrangement, it is possible to display the current state of said at least one device, so that it is possible for an observer of said at least one device to easily grasp the current state of said at least one device.

A data processing system includes: any one of the aforementioned data processing apparatuses; device state detection means for detecting a state of said at least one device and supplying device state information indicative of a result of the detection to the data processing apparatus; and operational activity performer detection means for detecting whether an operational activity performer is present at a predetermined position for doing an operational activity on said at least one device or an operational activity with said at least one device and supplying operational activity performer information indicative of a result of the detection to the data processing apparatus.

With the arrangement, it is possible to generate running performance information including information suitable for managing said at least one device.

A data processing method according to one or more embodiments of the present invention is a data processing method for generating running performance information indicative of a running state of at least one device, including the steps of: (i) causing device state detection means to detect a state of said at least one device; (ii) causing operational activity performer detection means to detect whether an operational activity performer is present at a predetermined position for doing an operational activity on said at least one device or an operational activity with said at least one device; (iii) causing results of detections in the steps (i) and (ii) to be stored in storage means, and (iv) causing analysis means to carry out a classification process in which the state of said at least one device is classified into a plurality of states including at least (a) a processing state which is a state where said at least one device carried out a predetermined process, (b) an operational activity state which is a state where the operational activity performer did the operational activity on said at least one device or the operational activity with said at least one device, and (c) a standby state which is a state where said at least one device was on standby in accordance with the results of detections in the steps (i) and (ii) which results have been stored in the storage means, and to generate the running performance information including a result of the classification process.

With the method, the state of said at least one device is detected in the step (i), whether an operational activity performer is present or not at a predetermined position for doing an operational activity on said at least one device or an operational activity with said at least one device is detected in the step (ii), and results of detections in the step (i) and the step (ii) are stored in storage means in the step (iii). Then, in the step (iv), there is carried out the classification process in which the state of said at least one device is classified into a plurality of states including at least (a) a processing state which is a state where said at least one device carried out a predetermined process, (b) an operational activity state which is a state where the operational activity performer did the operational activity on said at least one device or the operational activity with said at least one device, and (c) a standby state which is a state where said at least one device was on standby in accordance with the results of detections in the steps (i) and (ii) which results have been stored in the storage means, and the running performance information including a result of the classification process is generated. Thus, it is possible to classify the state of said at least one device into a plurality of states including the processing state, the operational activity state, and the standby state. Therefore, it is possible to generate running performance information including information suitable for managing said at least one device.

Industrial Applicability

One or more embodiments of the present invention is applicable to a data processing apparatus, a data processing system, and a data processing method each of which generates running performance information on a device in accordance with a result of detection of a state of the device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

Reference Signs List

1 Data processing system
10a-10c Detection process section (device state detection means, operational activity performer detection means)
11a1, 11a2 Illuminance sensor (device state detection means)
11b1-11b3 Illuminance sensor (device state detection means)
11c1, 11c2 Illuminance sensor (device state detection means)
12a-12c Human sensor (operational activity performer detection means)
13b Acceleration sensor (device state detection means)
14c Open-close sensor (device state detection means)
15a-15c Measured data process section
16a-16c Measured data storage section (result-of-detection storage section)
17a-17c Transmission process section
20 Data processing apparatus
21 Measured data storage process section
22 Measured data storage DB (result-of-detection storage section)
23 Running information analysis section (analysis section)
24 Running information storage DB (running information storage section)
25 Running information output section
26 Reception process section
A-C Manufacturing device

The invention claimed is:

1. A data processing apparatus for generating running performance information indicative of a running state of at least one device, comprising:
   a data storage process section that:
      obtains device state information indicative of a result of detection of a state of said at least one device, and
      obtains operational activity performer information indicative of a result of detection of whether an operational activity performer that performs an operational activity to said at least one device or an operational activity with said at least one device is present at a predetermined position for the operational activity performer to do the operational activity on said at least one device or the operational activity with said at least one device, and
      causes the device state information and the operational activity performer information to be stored in a result-of-detection storage; and
   an analysis section that carries out a classification process in which the state of said at least one device is classified into a plurality of states including at least:
      a processing state which is a state where said at least one device carried out a predetermined process,
      an operational activity state which is a state where the operational activity performer did the operational activity on said at least one device or the operational activity with said at least one device, and
      a standby state which is a state where said at least one device was on standby in accordance with the device state information and the operational activity performer information which have been stored in the result-of-detection storage, and generating the running performance information including a result of the classification process.

2. The data processing apparatus as set forth in claim 1, wherein the analysis section classifies the state of said at least one device into the processing state and other states in accordance with the device state information, and wherein the analysis section classifies said other states into the operational activity state and the standby state in accordance with the operational activity performer information.

3. The data processing apparatus as set forth in claim 1, wherein the analysis section classifies the state of said at least one device into the processing state, an abnormal state where an abnormality occurred in said at least one device, and other states in accordance with the device state information, and wherein the analysis section classifies said other states into the operational activity state and the standby state in accordance with the operational activity performer information.

4. The data processing apparatus as set forth in claim 1, wherein the analysis section classifies the state of said at least one device into the processing state, a halt state where said at least one device was at a halt, and other states in accordance with the device state information, and wherein the analysis section classifies said other states into the operational activity state and the standby state in accordance with the operational activity performer information.

5. The data processing apparatus as set forth in claim 1, wherein the analysis section classifies the state of said at least one device into the processing state, an abnormal state where an abnormality occurred in said at least one device, a halt state where said at least one device was at a halt, and other states in accordance with the device state information, and wherein the analysis section classifies said other states into the operational activity state and the standby state in accordance with the operational activity performer information.

6. The data processing apparatus as set forth in claim 2, wherein the device state information includes support state information indicative of a result of detection of a support state of support section that supports a processing target provided on said at least one device, and wherein the analysis section classifies the standby state into (I) a preparation state which is a state where the support section supported the processing target or a state where said at least one device was on standby while mounting of the processing target onto the support section or dismounting of the processing target from the support section was being performed and (II) a pre-step standby state which is a state where said at least one device was on standby while the support section did not support the processing target and neither of mounting of the processing target onto the support section nor dismounting of the processing target from the support section was being performed.

7. The data processing apparatus as set forth in claim 2, wherein the analysis section classifies, into the operational activity state, a period which is in said other states and during which presence of the operational activity performer at the predetermined position was continuously detected for a predetermined period or more, and the analysis section classifies, into the standby state, a period which is in said other states and during which presence of the operational activity performer at the predetermined position was not continuously detected for the predetermined period or more.

8. The data processing apparatus as set forth in claim 2, wherein the device state information includes lighting state information indicative of a result of detection of a lighting state of a signal light which indicates a state of said at least one device, wherein the signal light is provided on said at least one device, and wherein the analysis section carries out the classification process in accordance with the result of detection of the lighting state.

9. The data processing apparatus as set forth in claim 8, wherein the signal light discernibly indicates whether said at least one device is in the processing state in which said at least one device carries out the predetermined process, wherein the analysis section classifies, into the processing state, a period during which the lightening state was continued for a predetermined period or more, wherein the analysis section classifies, into the operational activity state, a period during which the lightening state was not continued for the predetermined period or more and during which the operational activity performer was present at the predetermined position or presence of the operational activity performer at the predetermined position was continuously detected for a predetermined period or more, and wherein the analysis section classifies, into the standby state, a period during which the lightening state was not continued for the predetermined period or more and which is in a state other than the operational activity state.

10. The data processing apparatus as set forth in claim 2, wherein the device state information includes movable section information indicative of a result of detection of a movement state of a movable section provided on said at least one device, and wherein the analysis section carries out the classification process in accordance with the movable section information.

11. The data processing apparatus as set forth in claim 10, wherein the analysis section classifies, into the halt state where said at least one device was at a halt, a period during which a movement velocity, acceleration, or a displacement amount of the movable section was kept to be less than a predetermined value for a predetermined period.

12. The data processing apparatus as set forth in claim 2, wherein the device state information includes consumed power information indicative of a result of detection of power consumed by said at least one device, and wherein the analysis section carries out the classification process in accordance with the consumed power information.

13. The data processing apparatus as set forth in claim 1, wherein the data storage process section obtains the device state information and the operational activity performer information with respect to a plurality of devices, which are said at least one device, and causes the device state information and the operational activity performer information to be stored in the result-of-detection storage, and wherein the analysis section generates the running performance information with respect to each of the plurality of devices.

14. The data processing apparatus as set forth in claim 13, wherein the plurality of devices include different types of devices, and wherein, for each of the different types of devices, the analysis section sets a method for the classification process individually.

15. The data processing apparatus as set forth in claim 1, wherein the data processing apparatus further comprises a display device,
wherein the analysis section classifies a current state of said at least one device into the plurality of states in accordance with past one of the device state information and past one of the operational activity performer information which are stored in the result-of-detection storage, and current one of the device state information and current one of the operational activity performer information which are obtained by the data storage process section, and
wherein the display device displays a result of classification by the analysis section of the current state of the device.

16. A data processing system, comprising:
a data processing apparatus as set forth in claim 1;
a device state detector that detects a state of said at least one device and supplying device state information indicative of a result of the detection to the data processing apparatus; and
an operational activity performer detector that detects whether an operational activity performer is present at a predetermined position for performing an operational activity on said at least one device or an operational activity with said at least one device and supplying operational activity performer information indicative of a result of the detection to the data processing apparatus.

17. A data processing method for generating running performance information indicative of a running state of at least one device, comprising:
(i) causing a device state detector to detect a state of said at least one device;
(ii) causing an operational activity performer detector to detect whether an operational activity performer is present at a predetermined position for performing an operational activity on said at least one device or an operational activity with said at least one device;
(iii) causing results of detections in the steps (i) and (ii) to be stored in storage, and
(iv) causing an analysis section to carry out a classification process in which the state of said at least one device is classified into a plurality of states including at least a processing state which is a state where said at least one device carried out a predetermined process, an operational activity state which is a state where the operational activity performer did the operational activity on said at least one device or the operational activity with said at least one device, and a standby state which is a state where said at least one device was on standby in accordance with the results of detections in the steps (i) and (ii) which results have been stored in the storage, and to generate the running performance information including a result of the classification process.

* * * * *